US010733580B2

(12) United States Patent
Suzukake

(10) Patent No.: US 10,733,580 B2
(45) Date of Patent: Aug. 4, 2020

(54) SETTLEMENT SYSTEM FOR COMBINING STORED VALUE TYPE PAYMENT SYSTEM AND SERVER MANAGEMENT PAYMENT SYSTEM

(71) Applicant: Rakuten, Inc., Shinagawa-ku, Tokyo (JP)

(72) Inventor: Wataru Suzukake, Shinagawa-ku (JP)

(73) Assignee: Rakuten, Inc., Tokyo (JP)

( * ) Notice: Subject to any disclaimer, the term of this patent is extended or adjusted under 35 U.S.C. 154(b) by 917 days.

(21) Appl. No.: 14/381,872

(22) PCT Filed: Mar. 1, 2013

(86) PCT No.: PCT/JP2013/055667
§ 371 (c)(1),
(2) Date: Aug. 28, 2014

(87) PCT Pub. No.: WO2013/129649
PCT Pub. Date: Sep. 6, 2013

(65) Prior Publication Data
US 2015/0019419 A1     Jan. 15, 2015

(30) Foreign Application Priority Data

Mar. 2, 2012  (JP) ................................. 2012-046757

(51) Int. Cl.
*G06Q 20/10*       (2012.01)
*G06Q 20/36*       (2012.01)
(Continued)

(52) U.S. Cl.
CPC ......... *G06Q 20/10* (2013.01); *G06Q 20/0652* (2013.01); *G06Q 20/341* (2013.01); *G06Q 20/3676* (2013.01)

(58) Field of Classification Search
CPC .. G06Q 20/10; G06Q 20/0652; G06Q 20/341; G06Q 20/3676; G06Q 20/322;
(Continued)

(56) References Cited

U.S. PATENT DOCUMENTS 5,744,787 A * 4/1998 Teicher ................. G06Q 20/04
235/375
5,945,652 A * 8/1999 Ohki ..................... G07F 7/0866
235/380

(Continued)

FOREIGN PATENT DOCUMENTS

CN          1465027 A      12/2003
JP        2004-171527 A     6/2004
(Continued)

OTHER PUBLICATIONS

STIC, Machine Translation of JP-2008191709-A, translated Apr. 23, 2019. (Year: 2008).*

(Continued)

*Primary Examiner* — Bennett M Sigmond
*Assistant Examiner* — Bolko M Hamerski
(74) *Attorney, Agent, or Firm* — Sughrue Mion, PLLC

(57) ABSTRACT

The purpose of the present invention is to enhance user convenience by combining stored value type and server management type payment systems. A portable terminal 5 stores a terminal-side value balance in the portable terminal, and an electronic money server 2 stores a server-side value balance related to the terminal-side value balance. At the time of payment, the portable terminal 5 connects to the electronic money server 2 via a payment terminal 6 or the Internet 3. Then, if payment can be made by using the server-side value balance, the electronic money server 2 makes payment by using the server-side value balance; if the server-side value balance is not enough and there is a (Continued)

shortfall, the electronic money server 2 adds an amount corresponding to the shortfall by subtracting the amount from the terminal-side value balance.

12 Claims, 12 Drawing Sheets

(51) Int. Cl.
  *G06Q 20/06* (2012.01)
  *G06Q 20/34* (2012.01)
(58) Field of Classification Search
  CPC .... G06Q 20/351; G06Q 20/20; G06Q 20/405; G06Q 20/34; G06Q 20/343; G06Q 20/36; G06Q 20/367; G06Q 20/065
  See application file for complete search history.

(56) References Cited

U.S. PATENT DOCUMENTS

| | | | | |
|---|---|---|---|---|
| 7,360,710 B2* | 4/2008 | Lindahl | ............... | G06K 19/00 235/379 |
| 7,996,324 B2* | 8/2011 | Bishop | ............... | G07F 7/1083 705/64 |
| 8,341,076 B1* | 12/2012 | Wilkes | ............... | G06Q 20/105 705/38 |
| 2001/0027435 A1* | 10/2001 | Asano | ............... | G06Q 20/105 705/38 |
| 2003/0034389 A1* | 2/2003 | Cantini | ............ | G06Q 20/4033 235/380 |
| 2004/0006536 A1* | 1/2004 | Kawashima | ......... | G06Q 20/04 705/39 |
| 2005/0125317 A1* | 6/2005 | Winkelman, III | ..... | G06Q 20/04 705/30 |
| 2005/0269396 A1* | 12/2005 | Schofield | ............. | G06Q 20/10 235/379 |
| 2006/0155641 A1* | 7/2006 | Postrel | ................ | G06Q 20/10 705/39 |
| 2006/0259390 A1* | 11/2006 | Rosenberger | ......... | G06Q 20/04 705/35 |
| 2008/0010189 A1* | 1/2008 | Rosenberger | ......... | G06Q 20/10 705/39 |
| 2008/0091599 A1* | 4/2008 | Foss, Jr. | ............. | G06Q 20/105 705/41 |
| 2008/0162348 A1* | 7/2008 | Lee | ................ | G06Q 20/10 705/44 |
| 2008/0197190 A1* | 8/2008 | Fujita | ............. | G06Q 20/0655 235/380 |
| 2008/0230601 A1* | 9/2008 | Suzuki | ............. | G06Q 20/06 235/380 |
| 2009/0043663 A1* | 2/2009 | Prater | ............. | G06Q 20/20 705/16 |
| 2009/0057396 A1* | 3/2009 | Barbour | ............. | G06Q 20/20 235/379 |
| 2009/0076957 A1* | 3/2009 | Bishop | ............. | G06Q 20/102 705/40 |
| 2009/0119190 A1* | 5/2009 | Realini | ............. | G06Q 20/04 705/30 |
| 2010/0274687 A1* | 10/2010 | Ghosh | ............. | G06Q 20/10 705/30 |
| 2010/0312617 A1* | 12/2010 | Cowen | ............. | G06Q 20/105 705/13 |
| 2012/0130786 A1* | 5/2012 | Marshall | ............. | G06Q 40/02 705/14.17 |
| 2012/0215692 A1* | 8/2012 | MacGuire | ........... | G06Q 20/105 705/44 |
| 2016/0086166 A1* | 3/2016 | Pomeroy | ............ | G06Q 20/3674 705/40 |

FOREIGN PATENT DOCUMENTS

| | | | | |
|---|---|---|---|---|
| JP | 2008-191709 A | | 8/2008 | |
| JP | 2008191709 A | * | 8/2008 | |
| WO | WO-0177931 A1 | * | 10/2001 | .......... G06Q 20/223 |
| WO | WO2001077931 A1 | * | 10/2001 | ............ G06Q 20/00 |
| WO | WO 2001077931 A1 | * | 10/2001 | .......... G06Q 20/322 |

OTHER PUBLICATIONS

Kuhn, Brad. "Credit Card Competition Sizzles Banks Getting a Run for Their Money From Giant Companies: [Sports Final Edition]." Sun Sentinel, Nov. 15, 1992, p. 1.F. ProQuest. Web. Mar. 27, 2020 <http://dialog.proquest.com/professional/docview/388967066?accountid=161862> (Year: 1992).*

International Search Report for PCT/JP2013/055667 dated Apr. 2, 2013.

* cited by examiner

Fig.5(a)

USER DB

| USER ID | SERVER-SIDE ELECTRONIC MONEY NUMBER | SERVER-SIDE VALUE BALANCE | ... |
|---|---|---|---|
| 1 2 ··· | 5 8 2 ··· | ¥4, 8 5 5 | ... |
| ⋮ | ⋮ | ⋮ | ⋮ |

| USER ID | TERMINAL-SIDE ELECTRONIC MONEY NUMBER | ... |
|---|---|---|
| 6 3 ··· | 7 9 5 ··· | ... |
| ⋮ | ⋮ | ⋮ |

Fig.5(b)

MEMBER STORE DB

| MEMBER STORE ID | PAYMENT TERMINAL ID | ASYNCHRONOUS PAYMENT TERMINAL ID | ... |
|---|---|---|---|
| 5 7 9 ··· | 6 7 8 ··· | — | ... |
| 8 5 2 ··· | — | 9 5 7 ··· | ... |
| 1 8 9 ··· | — | — | ... |
| ⋮ | ⋮ | ⋮ | ⋮ |

SETTLEMENT SYSTEM FOR COMBINING STORED VALUE TYPE PAYMENT SYSTEM AND SERVER MANAGEMENT PAYMENT SYSTEM

CROSS REFERENCE TO RELATED APPLICATIONS

This application is a National Stage of International Application No. PCT/JP2013/055667 filed Mar. 1, 2013, claiming priority based on Japanese Patent Application No. 2012-046757 filed Mar. 2, 2012, the contents of all of which are incorporated herein by reference in their entirety.

TECHNICAL FIELD

The present invention relates to information processing servers, information processing methods, information processing program products, and recording media on which the information processing program product is recorded and, for example, relates to what performs payment processing by using electronic money.

BACKGROUND ART

In recent years, the use of electronic money has become widespread. In electronic money, amount information called value is related to money value and fund settlement is performed by increasing or decreasing it.

FIG. 12 is a diagram for explaining an existing electronic money system.

An electronic money card 92 is an IC card owned by the user, and, on a built-in IC chip, the balance of value, an IC chip ID for identification of the IC chip, an electronic money number, and so forth are recorded. Moreover, a portable terminal 93, such as a mobile telephone, into which the IC chip is incorporated also exists.

A method for retaining value by the user's-side IC chip is called stored value type.

An asynchronous payment terminal 91 is installed in a store or the like and performs payment by value by performing short-distance radio communication with the IC chip of the electronic money card 92 or the portable terminal 93 and reducing the value balance stored in the IC chip.

The asynchronous payment terminal 91 completes the payment processing locally between the asynchronous payment terminal 91 and the IC chip of the user without connecting to an electronic money server 2 and stores the transaction history as log data.

Then, the asynchronous payment terminal 91 collectively transmits the log data to the electronic money server 2 later at regular or irregular intervals.

The reason why the asynchronous payment terminal 91 is called "asynchronous" is that the asynchronous payment terminal 91 completes the payment processing locally without being synchronous with the electronic money server 2.

At the time of application of this application, most of payment terminals disposed in member stores that can make payment by electronic money are asynchronous type payment terminals. This is because, for example, it is difficult to perform payment processing in real time by the electronic money server 2 by constantly connecting the electronic money server 2 and the payment terminal due to restrictions on the communication capacity of a network.

However, there has been a dramatic increase in the communication capacity of a network, and, as in a "server management type payment system" of Patent Document 1, a server management type system in which value is managed in a server and payment processing is performed on the server side has also emerged. It can be expected that, as the network infrastructure is improved, such a server management type system will become widespread in the future.

On the other hand, it is highly unlikely that the stored value type system, which is mainstream now, is immediately replaced by the server management type system, and it is believed that the stored value type system and the server management type system will coexist.

In this case, since it is believed that there will be an increase in the number of users who own both a stored value type payment means and a server management type payment means at the same time, creation of a payment mechanism in which consideration is given to the convenience of such users has been sought after.

CITATION LIST

Patent Literature

Patent Document 1: JP-A-2004-171527

DISCLOSURE OF INVENTION

Problem to be Solved by the Invention

An object of the present invention is to improve the convenience of the user by combining stored value type and server management type payment systems.

SUMMARY OF THE INVENTION

The invention described claim 1 provides an information processing server that connects to a money terminal storing first electronic value and having a function of increasing or decreasing a balance of the first electronic value by using predetermined amount change information and performs processing to make payment of a designated payment amount, the server comprising: an identification data acquiring unit that acquires identification data from the money terminal; and a shortfall amount reducing unit that generates amount change information for reducing the balance of the first electronic value by at least an amount corresponding to a shortfall and transmitting the amount change information to the money terminal if a determination that the shortfall occurs when a payment unit makes payment of the designated payment amount by using a payable amount of second electronic value stored in a storing unit on a server side in a state in which the second electronic value is related to the acquired identification data is made.

The invention described claim 2 provides the information processing server according to claim 1, wherein the payment unit subtracts an amount that is smaller than the designated amount by at least the amount corresponding to the shortfall from the payable amount of the second electronic value.

The invention described claim 3 provides the information processing server according to claim 1, wherein the payment unit increases the payable amount of the second electronic value by at least the amount corresponding to the shortfall and subtracts the amount corresponding to the shortfall from the increased payable amount.

The invention described claim 4 provides the information processing server according to claim 1, wherein the payment unit includes a first payment unit that subtracts the designated payment amount from the payable amount of the second electronic value if a determination that the balance of the first electronic value is larger than or equal to the amount corresponding to the shortfall is made, and a second payment unit that increases the payable amount of the second electronic value by at least the amount corresponding to the shortfall.

The invention described claim 5 provides the information processing server according to any one of claims 1 to 4, wherein the payable amount of the second electronic value is an amount obtained by subtracting a threshold value amount set for the second electronic value from a balance of the second electronic value.

The invention described claim 6 provides the information processing server according to claim 5, wherein the threshold value amount varies depending on a previously set condition.

The invention described claim 7 provides the information processing server according to claim 6, further comprising: a threshold value updating unit that updates the threshold value amount such that the threshold value amount becomes an amount that is larger than or equal to an automatic deduction amount of a nearest future that is previously set for the balance of the second electronic value if the automatic deduction amount of the nearest future varies.

The invention described claim 8 provides the information processing server according to claim 6, further comprising: a threshold value updating unit that updates the threshold value amount such that the threshold value amount becomes a same amount as the balance of the second electronic value every time the balance of the second electronic value is updated.

The invention described claim 9 provides the information processing server according to any one of claims 5 to 8, wherein when a second threshold value amount is set for the first electronic value and a balance obtained by subtracting the amount corresponding to the shortfall from the balance of the first electronic value becomes less than the second threshold value amount, the shortfall amount reducing unit reduces the balance of the first electronic value in such a way that a balance of the first electronic value after subtraction does not fall below the second threshold value amount, and the payment unit subtracts a difference between the balance of the first electronic value after subtraction and the amount corresponding to the shortfall from the payable amount of the second electronic value.

The invention described claim 10 provides the information processing server according to any one of claims 5 to 8, wherein when a second threshold value amount is set for the first electronic value and the balance of the first electronic value is less than the second threshold value amount, the payment unit subtracts at least an amount corresponding to a shortfall from the balance of the second electronic value and adds the amount subtracted from the balance of the second electronic value to the balance of the first electronic value.

The invention described claim 11 provides an information processing method performed by a computer, the information processing method that establishes connection to a money terminal storing first electronic value and having a function of increasing or decreasing a balance of the first electronic value by using predetermined amount change information and performs processing to make payment of a designated payment amount, the method comprising: an identification data acquiring step of acquiring identification data from the money terminal; and a shortfall amount reducing step of generating amount change information for reducing the balance of the first electronic value by at least an amount corresponding to a shortfall and transmitting the amount change information to the money terminal if a determination that the shortfall occurs when a payment unit makes payment of the designated payment amount by using second electronic value stored in a storing unit on a server side in a state in which the second electronic value is related to the acquired identification data is made.

The invention described claim 12 provides an information processing program product that makes a computer which connects to a money terminal storing first electronic value and having a function of increasing or decreasing a balance of the first electronic value by using predetermined amount change information and performs processing to make payment of a designated payment amount implement: an identification data acquiring function of acquiring identification data from the money terminal; and a shortfall amount reducing function of generating amount change information for reducing the balance of the first electronic value by at least an amount corresponding to a shortfall and transmitting the amount change information to the money terminal if a determination that the shortfall occurs when a payment unit makes payment of the designated payment amount by using a payable amount of second electronic value stored in a storing unit on a server side in a state in which the second electronic value is related to the acquired identification data is made.

The invention described claim 13 provides a recording medium on which an information processing program product is recorded, the information processing program product making a computer that connects to a money terminal storing first electronic value and having a function of increasing or decreasing a balance of the first electronic value by using predetermined amount change information and performs processing to make payment of a designated payment amount implement: an identification data acquiring function of acquiring identification data from the money terminal; and a shortfall amount reducing function of generating amount change information for reducing the balance of the first electronic value by at least an amount corresponding to a shortfall and transmitting the amount change information to the money terminal if a determination that the shortfall occurs when a payment unit makes payment of the designated payment amount by using a payable amount of second electronic value stored in a storing unit on a server side in a state in which the second electronic value is related to the acquired identification data is made.

Effect of the Invention

According to the present invention, it is possible to improve the convenience of the user by making stored value type and server management type payment systems work together.

BRIEF DESCRIPTION OF DRAWINGS

FIG. 5 is a diagram for explaining databases of the electronic money server;

BEST MODES FOR CARRYING OUT THE INVENTION (1) Outline of an Embodiment

A portable terminal 5 (FIG. 1) stores a terminal-side value balance in the portable terminal, and an electronic money server 2 stores a server-side value balance related to the terminal-side value balance.

At the time of payment, the portable terminal 5 connects to the electronic money server 2 via a payment terminal 6 or the Internet 3.

The electronic money server 2 sets the priorities of value balances used for payment in the order of the server-side value balance and the terminal-side value balance.

Then, if payment can be made by using the server-side value balance, the electronic money server 2 makes payment by using the server-side value balance; if the server-side value balance is not enough and there is a shortfall, the electronic money server 2 adds an amount corresponding to the shortfall by subtracting the amount from the terminal-side value balance.

In a first embodiment, the electronic money server 2 first makes payment by using the server-side value balance, and, if there is a shortfall, the electronic money server 2 makes payment of an amount corresponding to the shortfall from the terminal-side value balance.

In a second embodiment, if the server-side value balance is not enough and there is a shortfall, the electronic money server 2 transfers an amount corresponding to the shortfall from the terminal-side value balance to the server-side value balance and then makes payment of the whole payment amount by using the server-side value balance.

Incidentally, it is also possible to set the priorities in the order of the terminal-side value balance and the server-side value balance which is opposite to that of the embodiment.

In this case, if payment can be made by using the terminal-side value balance, the electronic money server 2 first makes payment by using the terminal-side value balance; if the terminal-side value balance is not enough and there is a shortfall, the electronic money server 2 adds an amount corresponding to the shortfall by subtracting the amount from the server-side value balance.

(2) Details of the First Embodiment

Figure 1:
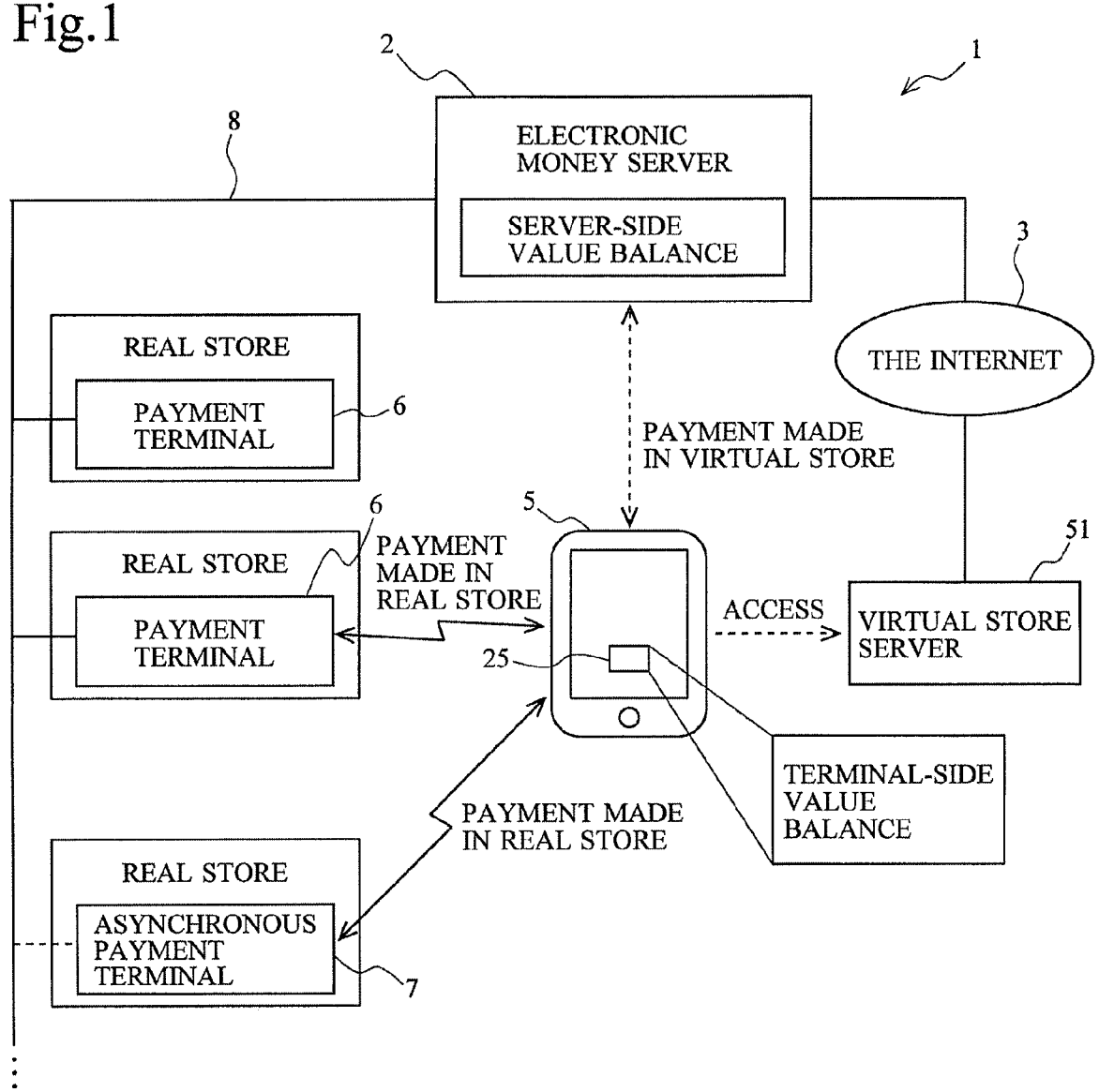
FIG. 1 is a diagram for explaining the network configuration of an electronic money system according to a first embodiment.

FIG. 1 is a diagram for explaining the network configuration of an electronic money system 1 according to the first embodiment.

The electronic money system 1 is configured by using the electronic money server 2, the Internet 3, the portable terminal 5, the payment terminal 6, an asynchronous payment terminal 7, a communication line 8, a virtual store server 51, and so forth.

The electronic money server 2 is a server that manages the transfer of money value by value. Here, value is electronic information related to money value, and the electronic money system 1 transfers the money value by increasing or decreasing the balance of value (hereinafter, a value balance).

In addition, a business entity of the electronic money system 1 relates the transfer of value to the transfer of actual money by transferring actual money in response to the transfer of value.

The electronic money server 2 stores a value balance in a state in which the value balance is related to the portable terminal 5. As will be described later, the portable terminal 5 stores a value balance also in the portable terminal 5, and, to distinguish between these value balances, the value balance stored on the electronic money server 2 side is called a server-side value balance, and the value balance stored by the portable terminal 5 is called a terminal-side value balance.

As described above, in the electronic money system 1, a server management type system based on the server-side value balance and a stored value type system based on the terminal-side value balance coexists.

Then, when receiving a payment request from the payment terminal 6 or the virtual store server 51, the electronic money server 2 first makes payment by using the server-side value balance, and, if there is a shortfall, the electronic money server 2 makes payment of an amount corresponding to the shortfall from the terminal-side value balance of the portable terminal 5.

The portable terminal 5 is a portable terminal formed as, for example, a smartphone, a mobile telephone, a game console, a tablet computer, or the like and has the function of connecting to the Internet 3 and the function of connecting to the payment terminal 6 and the asynchronous payment terminal 7 by short-distance radio communication.

The portable terminal 5 has a built-in general-purpose IC chip 25 and stores the terminal-side value balance therein.

The payment terminal 6 performs short-distance radio communication with the portable terminal 5 and performs communication also with the electronic money server 2 via the communication line 8, thereby transmitting information such as a payment amount to the electronic money server 2 and relaying the communication between the electronic money server 2 and the portable terminal 5. The payment terminal 6 is a synchronous payment terminal that performs online communication with the electronic money server 2 in real time at the time of payment using the portable terminal 5.

The payment terminal 6 is installed in an accounting counter, an automatic vending machine, or the like of a real store (a real store that is physically open in a real estate store or the like) such as a convenience store.

The communication line 8 is a line that connects the electronic money server 2 with the payment terminal 6. As the communication line 8, a dedicated line can be used, and a general-purpose line such as the Internet 3 may also be used.

The asynchronous payment terminal 7 is installed in, for example, a store and an automatic vending machine with insufficient network equipment and has the function of performing short-distance radio communication with the portable terminal 5.

The asynchronous payment terminal 7 makes payment by using the terminal-side value balance by performing short-distance radio communication with the portable terminal 5. The asynchronous payment terminal 7 is usually not connected to the electronic money server 2 (therefore cannot make real-time payment by using the server-side value balance) and temporarily stores the details of payment performed between the asynchronous payment terminal 7 and the portable terminal 5 as log data.

Then, the asynchronous payment terminal 7 connects to the electronic money server 2 around once a day, for example, by using the communication line 8 and transmits the log data to the electronic money server 2. In an environment with no network communication equipment, a person in charge sometimes manually collects a recording medium on which the log data is recorded.

As for the terminal-side value balance, the electronic money server 2 manages the fund transfer based on the log data in the payment terminal 6 and the asynchronous payment terminal 7.

The virtual store server 51 is a server of a virtual store that sells a product or service on the Internet 3.

The virtual store server 51 performs business transactions by accepting access from the portable terminal 5 or other user terminals (not depicted in the drawing) via the Internet 3.

The virtual store server 51 asks the electronic money server 2 to make payment, and payment is made between the electronic money server 2 and the portable terminal 5 by using the Internet 3 as a medium.

Figure 2:
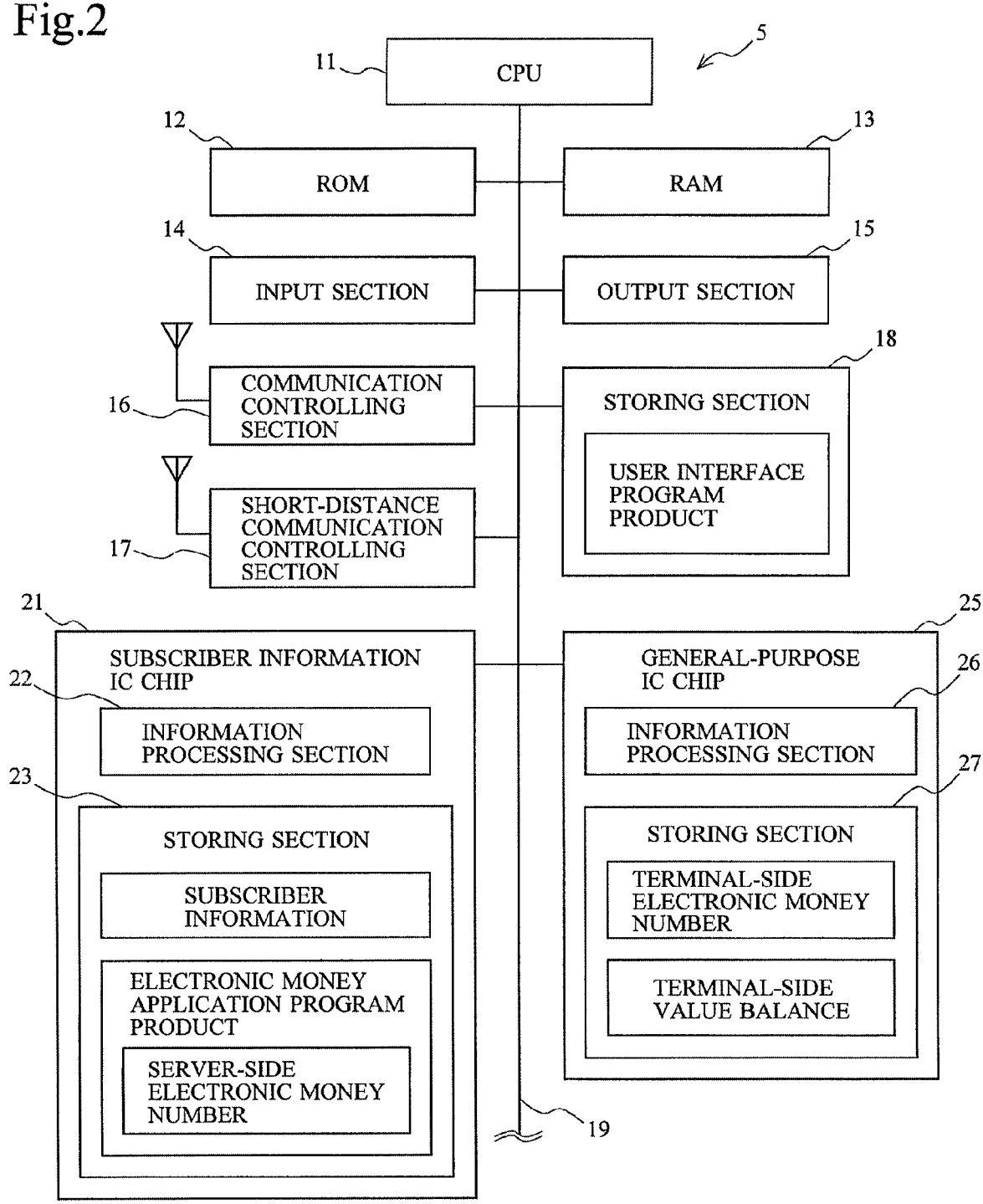
FIG. 2 is a diagram for explaining the hardware configuration of a portable terminal.

FIG. 2 is a diagram depicting the hardware configuration of the portable terminal 5. Here, as an example, it is assumed that the portable terminal 5 is a smartphone, but the same goes for a mobile telephone and other portable terminals.

The portable terminal 5 is formed of a CPU (Central Processing Unit) 11, ROM (Read Only Memory) 12, RAM (Random Access Memory) 13, an input section 14, an output section 15, a communication controlling section 16, a short-distance communication controlling section 17, a storing section 18, a subscriber information IC chip 21, a general-purpose IC chip 25, and so forth which are connected to one another by a bus line 19.

The CPU 11 performs various kinds of information processing and overall control of the portable terminal 5 by executing a program product recorded on the ROM 12 and the storing section 18. In this embodiment, for example, the CPU 11 supports payment processing using the server-side value balance and the terminal-side value balance by cooperating with the electronic money server 2 by the function offered by a user interface program product which will be described later.

The ROM 12 is read-only memory, and a basic program product used by the portable terminal 5 to operate, a parameter, data, and so forth are recorded thereon.

The RAM 13 is readable/writable memory and offers working memory used when the CPU 11 performs information processing.

The output section 15 is a functional section that outputs information to the user and is provided with, for example, a liquid crystal display for screen display, a speaker from which sound is output, and so forth. On the liquid crystal display, for example, an icon for starting the user interface program product is displayed.

The input section 14 is a functional section that inputs information from the outside and is provided with, for example, a touch panel installed on the liquid crystal display, a microphone that inputs sound, a camera that takes an image of a subject, and so forth. The user can enter information by touching the touch panel in response to the display on the liquid crystal display.

The storing section 18 is formed by using, for example, a recording medium such as an EEPROM (Electrically Erasable and Programmable ROM) and a hard disk, and an OS (Operating System) which is a basic program product that controls the portable terminal 5, the user interface program product that supports payment by value, and other program products and data are recorded thereon.

The communication controlling section 16 includes an antenna for performing radio communication with a base station antenna of a mobile telephone network and connects the portable terminal 5 to the Internet 3 or a telephone line. The portable terminal 5 can perform communication with the virtual store server 51 and the electronic money server 2 through the communication controlling section 16 via the Internet 3.

The short-distance communication controlling section 17 includes an antenna for performing short-distance radio communication with reader/writers of the payment terminal 6 and the asynchronous payment terminal 7 and connects the subscriber information IC chip 21 and the general-purpose IC chip 25 to the payment terminal 6 and the asynchronous payment terminal 7. In addition to performing communication with the payment terminal 6 via the short-distance communication controlling section 17, the subscriber information IC chip 21 and the general-purpose IC chip 25 can perform communication with the electronic money server 2 via the portable terminal 5, the payment terminal 6, and the communication line 8.

The subscriber information IC chip 21 is an IC chip that stores telephone subscriber information and is mounted on the portable terminal 5 as an IC card that can be attached to and detached from the portable terminal 5. This card is called a SIM (Subscriber Identity Module) card, for example.

The subscriber information IC chip 21 is formed of a CPU, RAM, ROM, and so forth and is provided with an information processing section 22 that performs information processing in accordance with various program products and a storing section 23 formed of nonvolatile memory.

In the storing section 23, subscriber information, a server-side electronic money number, and so forth are stored.

The telephone subscriber information includes ID information that identifies a telephone number, and the portable terminal 5 to which the subscriber information IC chip 21 is attached becomes a functioning portable terminal by this telephone number.

The server-side electronic money number is an account number of a value balance identifying the server-side value balance that is used in payment processing in the electronic money server 2.

As described above, since the subscriber information IC chip 21 stores the server-side electronic money number in addition to the subscriber information, when, for example, the user buys a new model to replace the portable terminal 5 with it, the user can continuously use the service by value in addition to the telephone number by the same server-side electronic money number by attaching the subscriber information IC chip 21 to the new portable terminal 5.

In addition, in the storing section 23, authentication data used by the electronic money server 2 to authenticate the subscriber information IC chip 21 can also be stored.

The general-purpose IC chip 25 is an IC chip that stores a general-purpose application and is mounted on the portable terminal 5 as an IC card that can be attached to and detached from the portable terminal 5. The user can download an application and stores the application in the general-purpose IC chip 25.

The general-purpose IC chip 25 is formed of a CPU, RAM, ROM, and so forth and is provided with an information processing section 26 that performs information processing in accordance with various program products and a storing section 27 formed of nonvolatile memory.

In the storing section 27, a terminal-side electronic money number, the terminal-side value balance, and, though not depicted in the drawing, a value operation program product used by the information processing section 26 to operate the terminal-side value balance, authentication data used by the electronic money server 2 to authenticate the general-purpose IC chip 25, and so forth are stored.

The terminal-side electronic money number is an account number used by the electronic money server 2 to identify the user of the terminal-side value balance.

Payment processing and increase processing related to the terminal-side value balance in the general-purpose IC chip 25 are performed by the value operation program product formed in the information processing section 26 in the general-purpose IC chip 25 in accordance with an instruction from the outside in order to increase security by limiting the terminal-side value balance processing to the inside of the general-purpose IC chip 25.

Incidentally, as for the value balance processing, information to be input to the subscriber information IC chip 21 and the general-purpose IC chip 25 is encrypted and is decoded in the subscriber information IC chip 21 and the general-purpose IC chip 25, and the information to be output from the subscriber information IC chip 21 and the general-purpose IC chip 25 is output after being encrypted in these chips.

Figure 3:
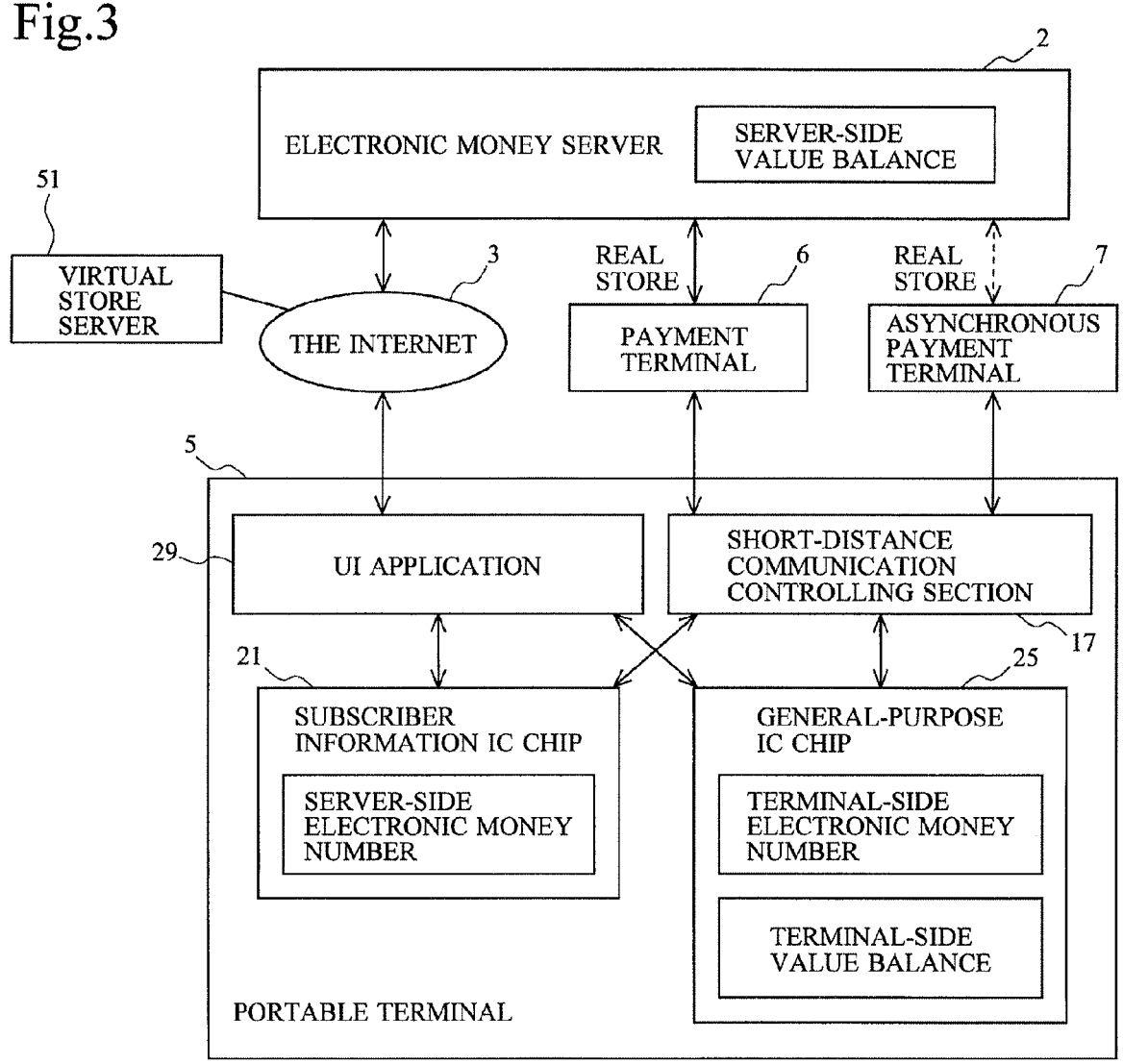
FIG. 3 is a diagram for explaining the function of the portable terminal.

FIG. 3 is a diagram for explaining the function of the portable terminal 5.

When the user interface program product stored in the storing section 18 is executed, a UI (User Interface) application 29 is formed in the portable terminal 5.

In the case of payment in a virtual store, the UI application 29 performs communication with the electronic money server 2 via the Internet 3.

In the case of payment in a real store provided with the payment terminal 6, the short-distance communication controlling section 17 performs communication with the payment terminal 6 and performs communication with the electronic money server 2 via the payment terminal 6.

In the case of payment in a real store provided with the asynchronous payment terminal 7, the short-distance communication controlling section 17 performs communication with the asynchronous payment terminal 7.

Moreover, the UI application 29 can access the subscriber information IC chip 21 and the general-purpose IC chip 25.

In the case of payment in a virtual store, the electronic money server 2 can read the server-side electronic money number from the subscriber information IC chip 21 by sending an instruction to the UI application 29 and increase or decrease the terminal-side value balance and read the terminal-side electronic money number by operating the value operation program product in the general-purpose IC chip 25.

In the case of payment in a real store, the short-distance communication controlling section 17 can read the server-side electronic money number from the subscriber information IC chip 21 and increase or decrease the terminal-side value balance and read the terminal-side electronic money number by operating the value operation program product in the general-purpose IC chip 25.

Figure 4:
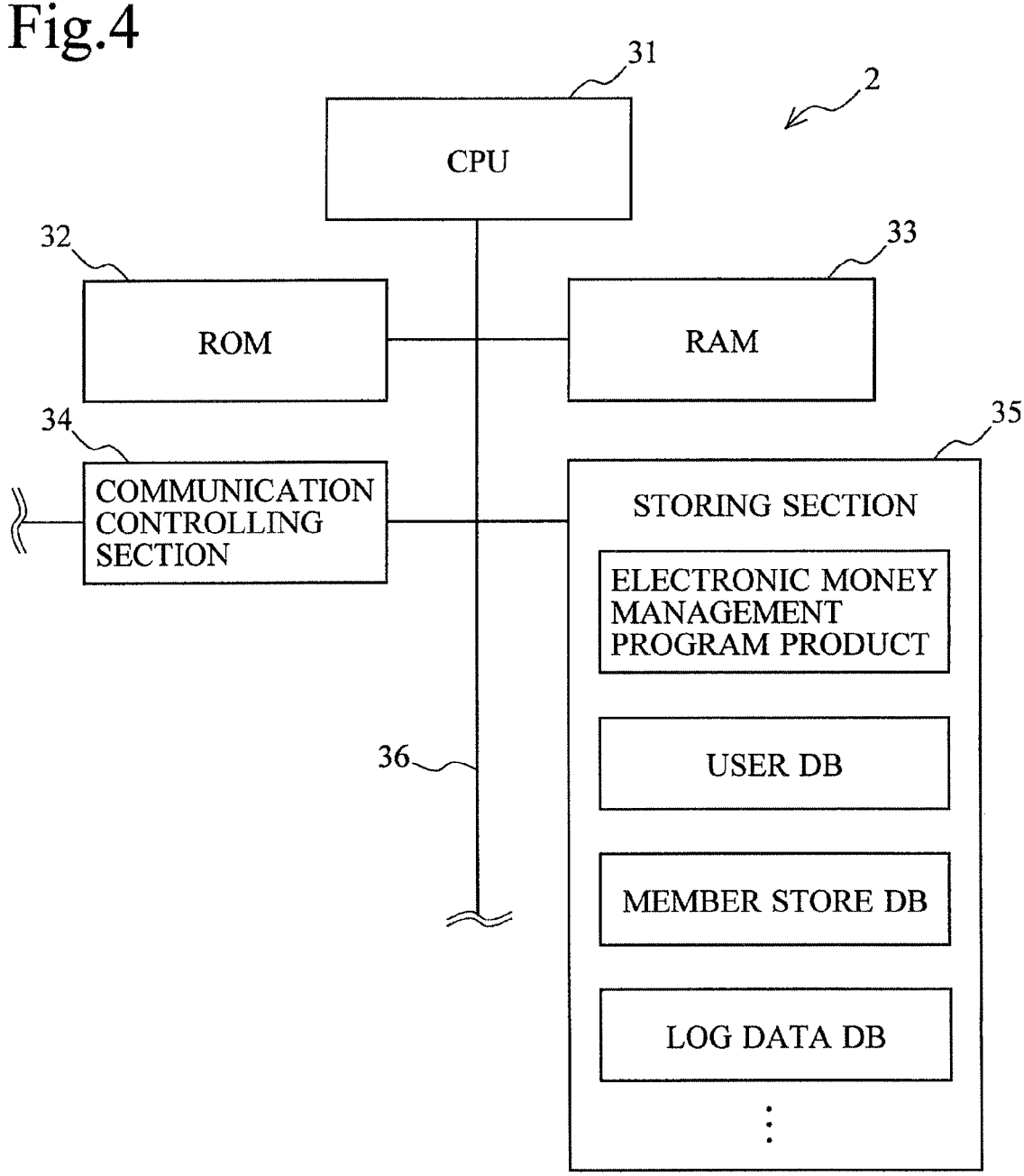
FIG. 4 is a diagram for explaining the configuration of an electronic money server.

FIG. 4 is a diagram for explaining the configuration of the electronic money server 2.

The electronic money server 2 is formed of a CPU 31, ROM 32, RAM 33, a communication controlling section 34, a storing section 35, and so forth which are connected to one another via a bus line 36.

The CPU 31 performs various kinds of information processing and overall control of the electronic money server 2 by executing the program product stored in the ROM 32 and the storing section 35.

In this embodiment, the CPU 31 performs payment processing by value by updating the server-side value balance or the terminal-side value balance in real time while performing communication with the payment terminal 6, the asynchronous payment terminal 7, the portable terminal 5, and the virtual store server 51.

Incidentally, as for payment by the asynchronous payment terminal 7, the electronic money server 2 receives the log data whose terminal-side value balance has been updated by the asynchronous payment terminal 7 from the asynchronous payment terminal 7 later and processes the log data.

The ROM 32 is read-only memory, and a basic program product used by the electronic money server 2 to operate, a parameter, data, and so forth are recorded thereon.

The RAM 33 is readable/writable memory and offers working memory used when the CPU 31 performs information processing.

With the communication controlling section 34, the electronic money server 2 performs communication with the payment terminal 6, the asynchronous payment terminal 7, and the portable terminal 5 via the communication line 8 and performs communication with the portable terminal 5 and the virtual store server 51 via the Internet 3.

The storing section 35 is formed of, for example, a large-capacity hard disk, and an electronic money management program product and other program products which are used by the CPU 31 to perform payment processing by value, a user DB (database) managing a user's server-side value balance and terminal-side value balance, a member store DB managing value payment performed in a member store, a log data DB storing log data of each payment processing, and so forth are recorded thereon.

Incidentally, in an example of FIG. 4, a single electronic money server 2 has been described, but this electronic money server 2 may be formed of a plurality of servers by distributing the functions thereof.

Next, the databases of the electronic money server 2 will be described by using each diagram of FIG. 5.

FIG. 5(a) is a diagram for explaining the logical configuration of the user DB.

In this embodiment, the user DB for the server-side electronic money number and the user DB for the terminal-side electronic money number are formed separately.

In the portable terminal 5, the subscriber information IC chip 21 and the general-purpose IC chip 25 are removable. Therefore, there is a possibility that the combination of the server-side value balance and the terminal-side value balance performing payment processing in conjunction with each other is changed by replacement of these chips. Thus, the user DB for the server-side electronic money number and the user DB for the terminal-side electronic money number are formed separately and are related to each other by mounting of the subscriber information IC chip 21 and the general-purpose IC chip 25 on the portable terminal 5.

The user DB for the server-side electronic money number is formed of "user ID", "server-side electronic money number", "server-side value balance", and other items. For example, the authentication data for the subscriber information IC chip 21 can also be registered therein.

The item "user ID" is user identification information.

The item "server-side electronic money number" is an account number for distinguishing a server-side value balance from the server-side value balances of other users.

The item "server-side value balance" is a server-side value balance of the account identified by the item "server-side electronic money number".

On the other hand, the user DB for the terminal-side electronic money number is formed of "user ID", "terminal-side electronic money number", though not depicted in the drawing, items such as authentication data for the general-purpose IC chip 25, and so forth.

The item "user ID" is user identification information. This user ID does not have to be the same as the user ID in the user DB for the server-side electronic money number for one user.

The item "terminal-side electronic money number" is an account number for distinguishing a terminal-side value balance from the terminal-side value balances of other users.

In the above example, since the user DB for the server-side electronic money number and the user DB for the terminal-side electronic money number are formed independently, the combination of the server-side value balance and the terminal-side value balance cooperating with each other is defined by the combination of the subscriber information IC chip 21 and the general-purpose IC chip 25 that are physically mounted on the portable terminal 5.

FIG. 5(*b*) is a diagram for explaining the logical configuration of the member store DB.

The member store DB is formed of "member store ID", "payment terminal ID", "asynchronous payment terminal ID", and other items.

The item "member store ID" is information for identifying a business operator who gets payment service by electronic money, the service offered by the electronic money system 1.

The item "payment terminal ID" is information for identifying the payment terminal 6 of the member store.

The item "asynchronous payment terminal ID" is information for identifying the asynchronous payment terminal 7 of the member store.

Incidentally, when the member store is a virtual store, since the member store does not have the payment terminal 6 and the asynchronous payment terminal 7, in place of these terminal IDs, for example, information that identifies the virtual store server 51, such as the IP address of the virtual store server 51, is used.

The payment terminal 6, the asynchronous payment terminal 7, and the virtual store server 51 notify the electronic money server 2 of the payment terminal ID or the like thereof when connecting thereto. As a result, the electronic money server 2 can identify the member store ID of the member store related to fund transfer.

Incidentally, since a business operator generally installs a plurality of payment terminals in one store, a plurality of payment terminal IDs and a plurality of asynchronous payment terminal IDs are generally related to one member store ID.

Moreover, since the payment amount of a commercial transaction performed in the member store is recorded on the log data in a state in which the payment amount is related to the member store ID, the member store ID functions as an account number of the member store.

Figure 6:
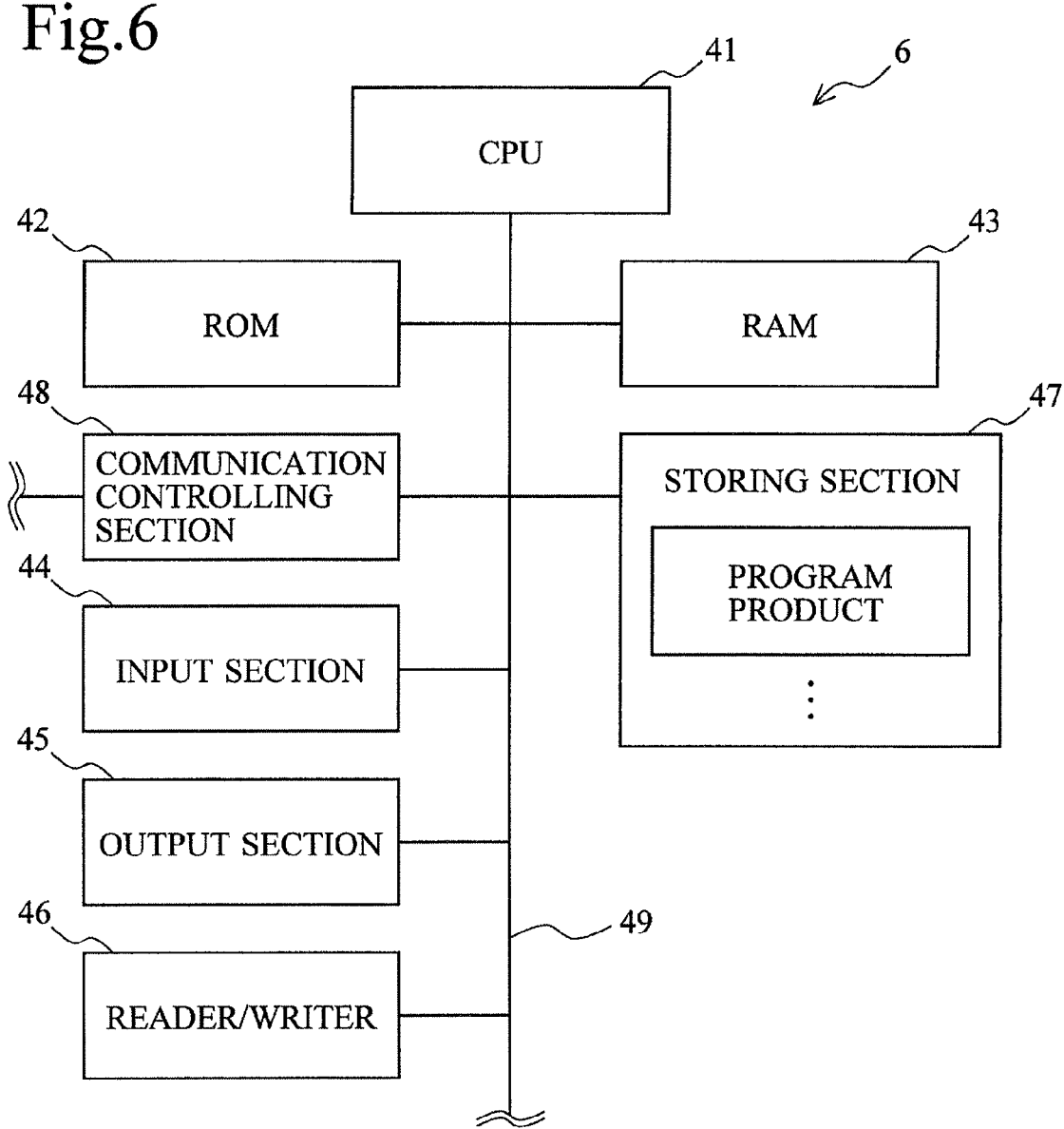
FIG. 6 is a diagram for explaining the configuration of a payment terminal.

FIG. 6 is a diagram for explaining the configuration of the payment terminal 6.

The payment terminal 6 is formed of a CPU 41, ROM 42, RAM 43, an input section 44, an output section 45, a reader/writer 46, a storing section 47, and a communication controlling section 48 which are connected to one another via a bus line 49.

The CPU 41 performs various kinds of information processing and performs overall control of the payment terminal 6 by executing the program product recorded on the ROM 42 and the storing section 47.

In this embodiment, the CPU 41 mediates communication between the portable terminal 5 and the electronic money server 2 and supports payment processing using the server-side value balance and the terminal-side value balance.

The ROM 42 is read-only memory, and a basic program product used by the payment terminal 6 to operate, a parameter, data, and so forth are recorded thereon.

The RAM 43 is readable/writable memory and offers working memory used when the CPU 41 performs information processing.

The input section 44 is provided with input devices such as a touch panel installed on the liquid crystal display and a keyboard and accepts, for example, the entry of the payment amount.

The output section 45 is provided with a liquid crystal display for displaying an image for touch panel input, a speaker from which sound such as sound effect at the time of payment is output, and so forth.

The reader/writer 46 performs short-distance radio communication with the portable terminal 5 by using a built-in antenna.

On the storing section 47, for example, a program product for making the CPU 41 fulfill the function of performing payment processing with the electronic money server 2 is recorded.

The communication controlling section 48 connects the electronic money server 2 and the payment terminal 6 via the communication line 8. This connection is performed at all times; instead, this connection may be established every time payment processing is performed.

The asynchronous payment terminal 7 includes, in addition to the component elements of the payment terminal 6, a secure module (not depicted in the drawing) that stores key data used for encryption and decoding of data.

The asynchronous payment terminal 7 completes payment processing locally by using the terminal-side value balance of the portable terminal 5 and transmits the log data to the electronic money server 2 at regular or irregular intervals by using the communication controlling section 48.

Figure 7:
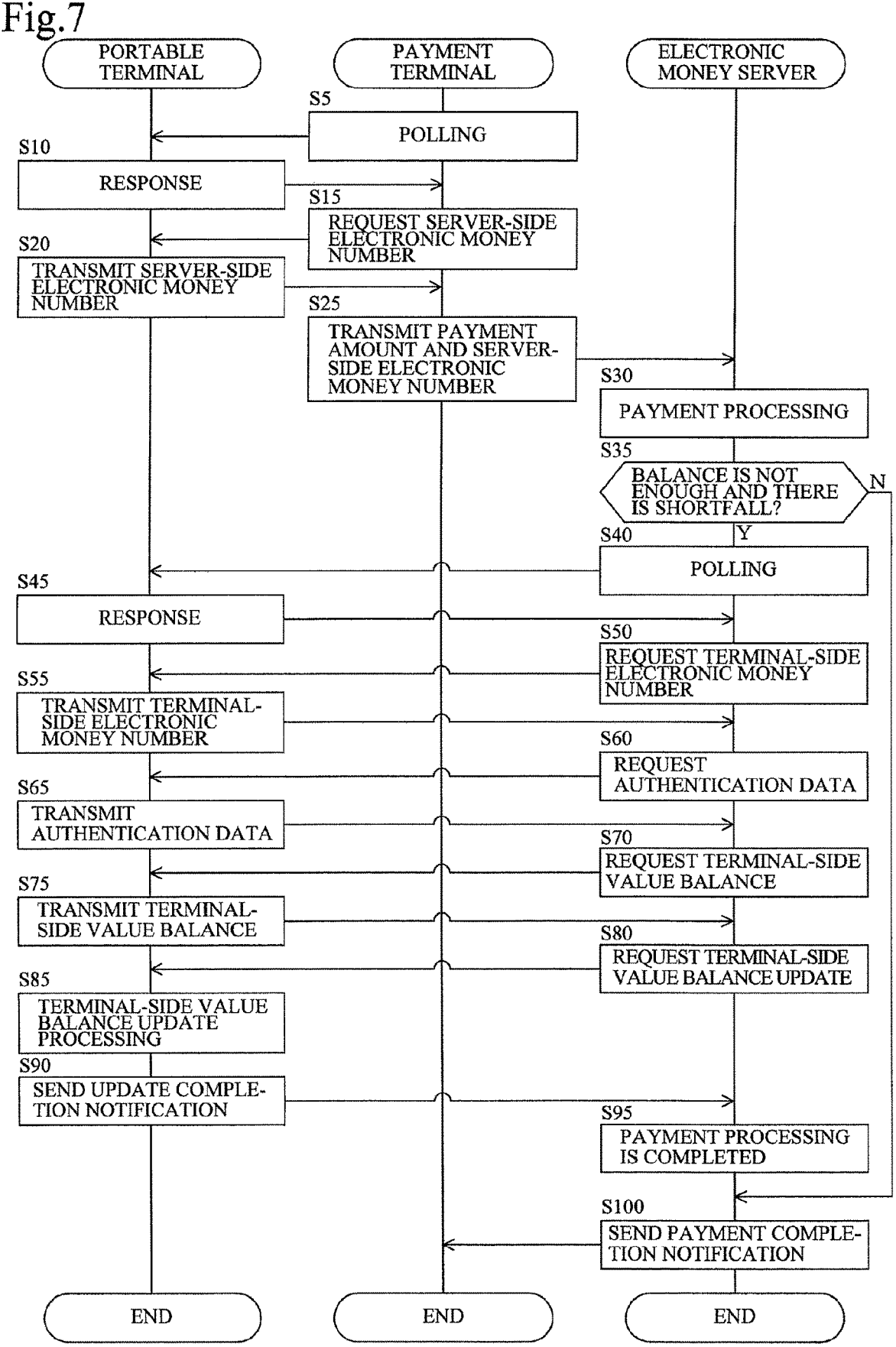
FIG. 7 is a flowchart for explaining the payment procedure in a real store.

FIG. 7 is a flowchart for explaining the procedure by which the electronic money server 2 makes online payment in a real store by using the server-side value balance and the terminal-side value balance.

In the electronic money server 2, settings are made such that the server-side value balance has higher payment priority than the terminal-side value balance, and, if payment processing is performed by using the server-side value balance and there is a shortfall, payment of an amount corresponding to the shortfall is made by using the terminal-side value balance.

The following processing is performed by the CPUs of the subscriber information IC chip 21 and the general-purpose IC chip 25 of the portable terminal 5, the CPU 41 of the payment terminal 6, and the CPU 31 of the electronic money server 2 in accordance with a predetermined program product.

First, the user who makes payment created by shopping starts the UI application 29 by, for example, touching an icon of the portable terminal 5 for real store payment.

Instead, a configuration may also be adopted in which the UI application 29 is started after the user is authenticated as a result of inputting a user ID, a password, and so forth. Moreover, a configuration may also be adopted in which the UI application 29 is started after the user is authenticated by using biometric identity verification such as a finger print.

After the UI application 29 is started, the UI application 29 releases the lock so that the CPUs of the subscriber information IC chip 21 and the general-purpose IC chip 25 of the portable terminal 5 can accept polling from the payment terminal 6 or the asynchronous payment terminal 7.

On the other hand, on the payment terminal 6 side, a person in charge of the store enters product information by, for example, reading the bar code of a product with a reader and starts the payment terminal 6. The payment terminal 6 obtains a payment amount by the read product information.

After the payment terminal 6 is started, the payment terminal 6 performs polling on the CPU of the subscriber information IC chip 21 of the portable terminal 5 (step 5). This polling is processing performed to check the presence of the other party (the subscriber information IC chip 21) with which payment by the server-side value balance is made.

When receiving the polling from the payment terminal 6, the CPU of the subscriber information IC chip 21 of the portable terminal 5 returns a response to the payment terminal 6 (step 10). This response is given by, for example, sending back the ID information of the subscriber information IC chip 21.

A configuration can also be adopted in which the payment terminal 6 then requests authentication data from the CPU of the subscriber information IC chip 21 of the portable terminal 5 and authenticates the subscriber information IC chip 21.

When receiving a response from the CPU of the subscriber information IC chip 21 of the portable terminal 5, the payment terminal 6 requests a server-side electronic money number from the CPU of the subscriber information IC chip 21 of the portable terminal (step 15).

When receiving the request from the payment terminal 6, the CPU of the subscriber information IC chip 21 of the portable terminal 5 reads the server-side electronic money number from the subscriber information IC chip 21 and transmits the server-side electronic money number to the payment terminal 6 (step 20).

When receiving the server-side electronic money number from the CPU of the subscriber information IC chip 21 of the portable terminal 5, the payment terminal 6 transmits the payment amount and the server-side electronic money number to the electronic money server 2 (step 25).

The processing which follows is performed between the CPUs of the subscriber information IC chip 21 and the general-purpose IC chip 25 of the portable terminal 5 and the electronic money server 2, and the payment terminal 6 relays the communication between the portable terminal 5 and the electronic money server 2 by short-distance radio communication performed by the reader/writer 46 and communication performed via the communication line 8.

When receiving the server-side electronic money number from the payment terminal 6, the electronic money server 2 searches the user DB for the server-side electronic money number and obtains the server-side value balance identified by the server-side electronic money number.

Then, the electronic money server 2 makes payment of the payment amount by using all of the amount payable by using the server-side value balance (step 30). The payable amount may be the whole amount of the server-side value balance; alternatively, if a threshold value is set for the server-side value balance as a minimum balance, the payable amount can be set at the whole amount obtained by removing the minimum balance from the server-side value balance.

Next, the electronic money server 2 determines whether or not the balance was not enough and there was a shortfall in payment processing, that is, payment of only part of the payment amount could be made (step 35).

If there is no shortfall (step 35; N), the electronic money server 2 sends a payment completion notification to the payment terminal 6 and ends the processing (step 100).

If there is a shortfall (step 35; Y), the electronic money server performs polling on the general-purpose IC chip 25 (step 40). This polling is processing performed to check the presence of the other party (the general-purpose IC chip 25) with which payment by the terminal-side value balance is made.

When receiving the polling from the electronic money server 2, the CPU of the general-purpose IC chip 25 of the portable terminal 5 returns a response to the electronic money server 2 (step 45). This response is given by, for example, sending back the ID information of the general-purpose IC chip 25.

When receiving the response from the CPU of the general-purpose IC chip 25 of the portable terminal 5, the electronic money server 2 requests the terminal-side electronic money number from the general-purpose IC chip 25 of the portable terminal 5 (step 50).

When receiving the request for the terminal-side electronic money number from the electronic money server 2, the CPU of the general-purpose IC chip 25 of the portable terminal 5 reads the terminal-side electronic money number from the general-purpose IC chip 25 and transmits the terminal-side electronic money number to the electronic money server 2 (step 55).

When receiving the terminal-side electronic money number from the CPU of the general-purpose IC chip 25 of the portable terminal 5, the electronic money server 2 requests authentication data from the CPU of the general-purpose IC chip 25 of the portable terminal 5 (step 60).

When receiving the request for the authentication data from the electronic money server 2, the CPU of the general-purpose IC chip 25 of the portable terminal 5 reads the authentication data from the general-purpose IC chip 25 and transmits the authentication data to the electronic money server 2 (step 65).

When receiving the authentication data from the CPU of the general-purpose IC chip 25 of the portable terminal 5, the electronic money server 2 authenticates the general-purpose IC chip 25 by using it. Incidentally, though not depicted in the drawing, if authentication is not successfully performed, the electronic money server 2 notifies the CPU of the general-purpose IC chip 25 of the portable terminal 5 that authentication has not been successfully performed and ends the processing.

If authentication is successfully performed, the electronic money server 2 requests the terminal-side value balance from the CPU of the general-purpose IC chip 25 of the portable terminal 5 (step 70).

When receiving the request for the terminal-side value balance from the electronic money server 2, the CPU of the general-purpose IC chip 25 of the portable terminal 5 reads the terminal-side value balance from the general-purpose IC chip 25 and transmits the terminal-side value balance to the electronic money server 2 (step 75).

When receiving the terminal-side value balance from the portable terminal 5, the electronic money server 2 determines whether or not the balance is large enough to make payment of an amount corresponding to the shortfall.

Incidentally, when a threshold value of a minimum balance is set for the terminal-side value balance, the electronic money server 2 determines whether or not, of the terminal-side value balance, the balance of value that can be used for payment is large enough to make payment of the amount corresponding to the shortfall.

If the balance is not large enough to make payment of the amount corresponding to the shortfall, the electronic money server 2 sends an error notification to the CPU of the general-purpose IC chip 25 of the portable terminal 5 and restores the server-side value balance from which payment has been made in step 30 to the balance before payment and stops the payment processing.

If the balance is large enough to make payment of the amount corresponding to the shortfall, since the electronic money server 2 makes payment of the amount corresponding to the shortfall in the payment processing in step 30 by using the terminal-side value balance, the electronic money server 2 transmits a terminal-side value balance update request to the CPU of the general-purpose IC chip 25 of the portable terminal 5 such that the terminal-side value balance is updated to an amount which is smaller than the present terminal-side value balance by the amount corresponding to the shortfall after update (step 80).

The CPU of the general-purpose IC chip 25 of the portable terminal 5 receives the terminal-side value balance update request from the electronic money server 2 and performs terminal-side value balance update processing by which the amount corresponding to the shortfall is subtracted from the terminal-side value balance in the general-purpose IC chip 25 (step 85).

As the terminal-side value balance update processing that is performed here, the following method is possible.

(Method 1) A case where an overwriting instruction is sent as the terminal-side value balance update request.

In this case, the electronic money server 2 subtracts an amount corresponding to the shortfall from the terminal-side value balance received from the CPU of the general-purpose IC chip 25 of the portable terminal 5 and calculates the balance after subtraction. Then, the electronic money server 2 sends, as the terminal-side value balance update request, an overwriting instruction by which overwrites is to become the balance after calculation. The CPU of the general-purpose IC chip 25 of the portable terminal 5 performs update by performing overwriting with the terminal-side value balance in accordance with the overwriting instruction.

(Method 2) A case where a subtraction instruction is sent as the terminal-side value balance update request.

In this case, the electronic money server 2 sends a subtraction instruction by which an amount corresponding to the shortfall is subtracted from the terminal-side value balance to the CPU of the general-purpose IC chip 25 of the portable terminal 5 as the terminal-side value balance update request. The CPU of the general-purpose IC chip 25 of the portable terminal 5 updates the terminal-side value balance by subtracting an amount corresponding to the shortfall from the terminal-side value balance in accordance with the instruction.

After updating the terminal-side value balance in this manner, the CPU of the general-purpose IC chip 25 of the portable terminal 5 sends an update completion notification to the electronic money server 2 (step 90).

When receiving the update completion notification from the CPU of the general-purpose IC chip 25 of the portable terminal 5, the electronic money server 2 produces records to the effect that the payment processing has been completed by using the terminal-side value balance (step 95).

Then, the electronic money server 2 sends a payment completion notification to the payment terminal 6 (step 100).

Figure 8:
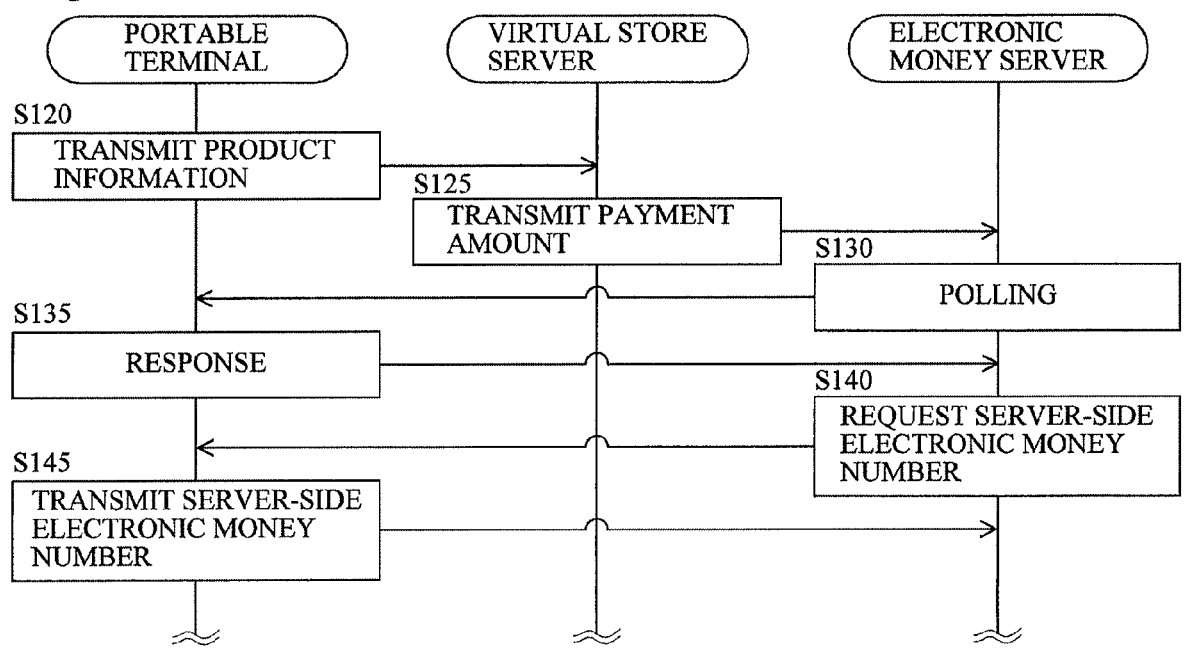
FIG. 8 is a flowchart for explaining the payment procedure in a virtual store.

FIG. 8 is a flowchart for explaining the procedure by which the electronic money server 2 makes online payment in a virtual store by using the server-side value balance and the terminal-side value balance.

First, the user connects the portable terminal 5 to the Internet 3 and does online shopping by accessing a website of the virtual store server 51.

Then, the user determines a product (or service) to be purchased and notifies the virtual store server 51 of the product to be purchased. This operation is performed by, for example, setting a product number and the number of products to be purchased on a browser.

As a result of this notification, the product information is transmitted from the portable terminal 5 to the virtual store server 51 (step 120).

When receiving the product information from the portable terminal 5, the virtual store server 51 transmits the payment amount to the electronic money server 2 (step 125) and redirects (transfers) connection from the portable terminal 5 to the electronic money server 2. From this point forward, the electronic money server 2 and the portable terminal 5 perform direct communication via the Internet 3.

When receiving the payment amount information from the virtual store server 51, the electronic money server 2 performs polling on the portable terminal 5 (step 130). This polling corresponds to step 5 of FIG. 7.

The portable terminal 5 transmits a response to the electronic money server 2 in response to the polling (step 135).

When receiving the response from the portable terminal 5, the electronic money server 2 requests the server-side electronic money number from the portable terminal 5 (step 140).

The portable terminal 5 receives this request and transmits the server-side electronic money number to the electronic money server 2 (step 145).

The processing which follows is the same as the processing which is performed from step 30 of FIG. 7. However, in an example of FIG. 8, in place of the payment terminal 6, the UI application 29 of the portable terminal 5 relays the communication between the CPUs of the subscriber information IC chip 21 and the general-purpose IC chip 25 and the electronic money server 2.

Each diagram of FIG. 9 is a diagram for explaining a modified example of the portable terminal 5.

FIG. 9(*a*) depicts an example in which, in addition to the server-side electronic money number, the terminal-side electronic money number and the terminal-side value balance are stored in the subscriber information IC chip 21 attached to the portable terminal 5.

In this example, by attaching the subscriber information IC chip 21 to another portable terminal 5 when, for example, the model is changed to a new model, it is possible to transfer not only the server-side electronic money number but also the terminal-side electronic money number and the terminal-side value balance to the other portable terminal 5 in an integrated manner.

Incidentally, in this case, since the server-side electronic money number and the terminal-side electronic money number are not transferred to another portable terminal 5 separately, it is possible to integrate the server-side electronic money number and the terminal-side electronic money number into one electronic money number.

By recording the log data in such a way that, for example, a flag is set in the electronic money number when payment is made by using the server-side value balance and a flag is not set in the electronic money number when payment is made by using the terminal-side value balance, the electronic money server 2 can determine whether payment has been made from the account of the server-side value balance or from the account of the terminal-side value balance.

Figure 9A:
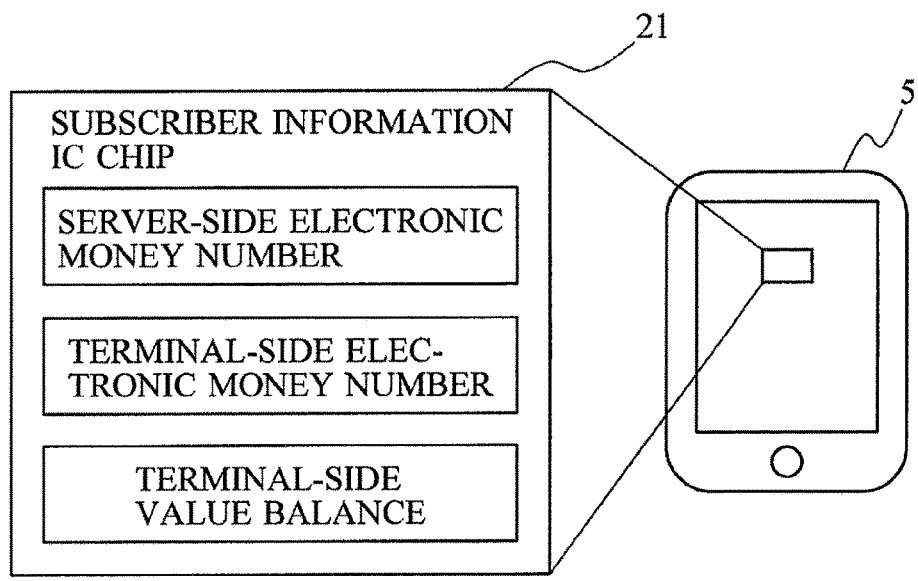
FIG. 9 is a diagram for explaining a modified example of the portable terminal.
Figure 9B:
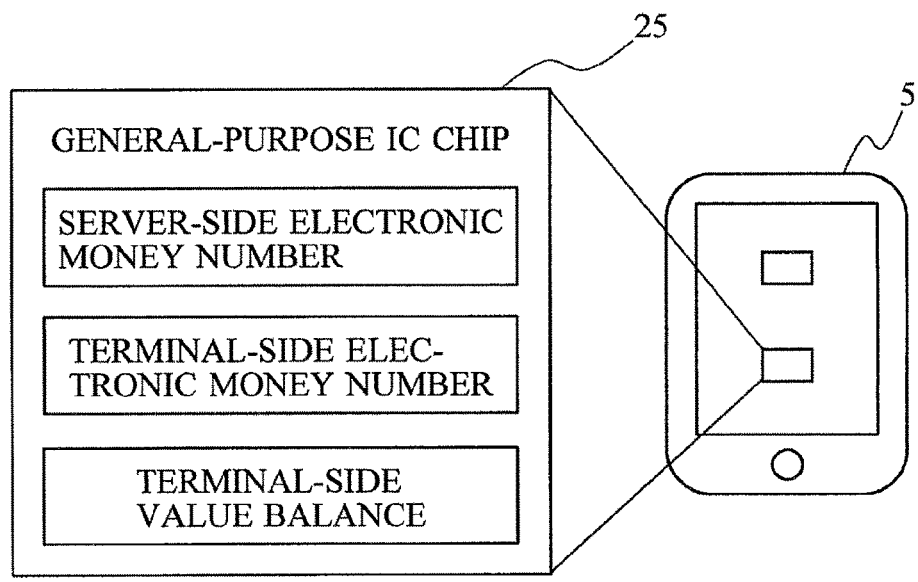

FIG. 9(b) depicts a case where the server-side electronic money number, the terminal-side electronic money number, and the terminal-side value balance are set in the general-purpose IC chip 25.

When the payment function by electronic money is formed in the general-purpose IC chip 25 in this manner, by attaching the general-purpose IC chip 25 to another portable terminal 5, it is possible to transfer the payment function by value to the other portable terminal 5 with the subscriber information IC chip 21 of the portable terminal 5 attached thereto (that is, without changing the subscriber information of the portable terminal 5).

Incidentally, as is the case with FIG. 9(a), it is possible to integrate the server-side electronic money number and the terminal-side electronic money number into one electronic money number.

Figure 9C:
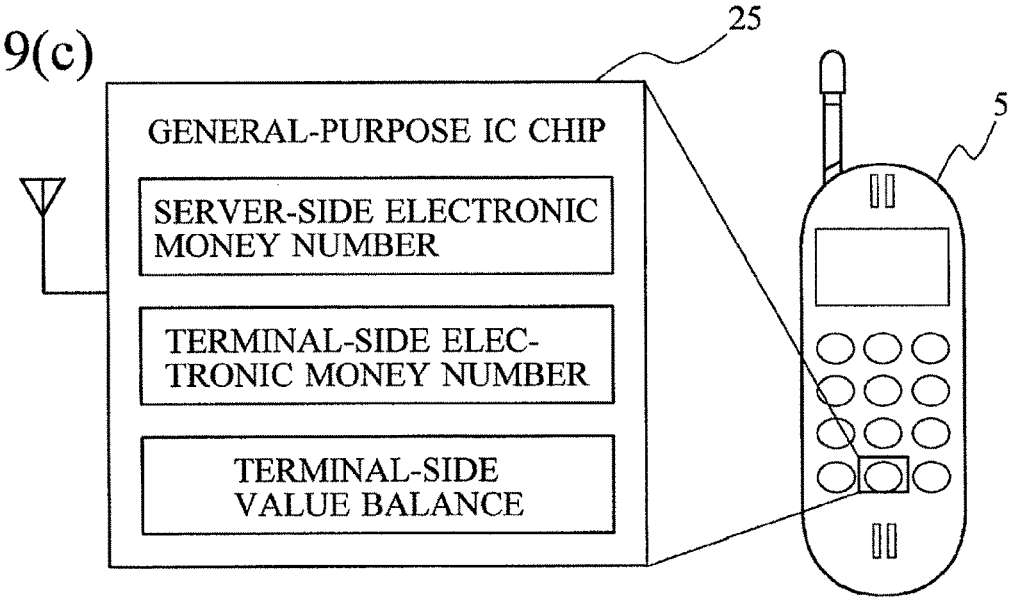

FIG. 9(c) depicts an example in which the general-purpose IC chip 25 is provided with the function of performing short-distance radio communication with the payment terminal 6 and the asynchronous payment terminal 7.

In the example of the diagram, the server-side electronic money number, the terminal-side electronic money number, and the terminal-side value balance are set in the general-purpose IC chip 25, but they may be formed in the subscriber information IC chip 21.

In the embodiment, the portable terminal 5 performs short-distance radio communication with the reader/writers 46 of the payment terminal 6 and the asynchronous payment terminal 7 by the short-distance communication controlling section 17 of the portable terminal 5; in this example, the portable terminal 5 can perform short-distance radio communication with the payment terminal 6 and the asynchronous payment terminal 7 by the short-distance radio communication function of the general-purpose IC chip 25.

Figure 10:
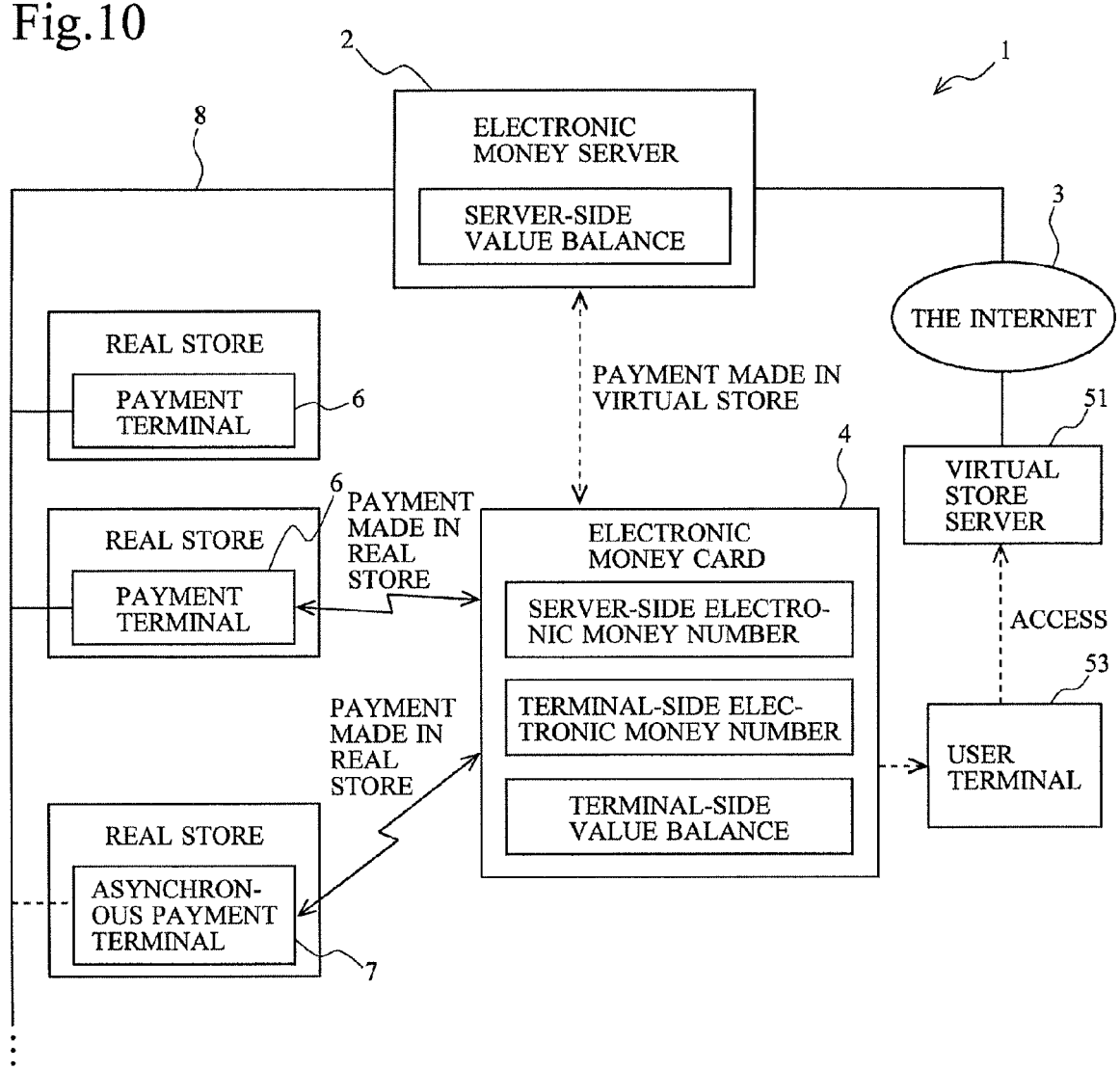
FIG. 10 is a diagram for explaining an example using an electronic money card.

FIG. 10 is a diagram for explaining an example in which an electronic money card 4 is used.

In the embodiment, the portable terminal 5 is used, but it is also possible to use the electronic money card 4. Incidentally, since the portable terminal 5 which has been described in the above embodiment and the electronic money card 4 each have a built-in general-purpose IC chip 25, they can be collectively called a money terminal.

The electronic money card 4 is an IC card with the built-in general-purpose IC chip 25 and is provided with the function of performing short-distance radio communication with the payment terminal 6 and the asynchronous payment terminal 7. Incidentally, the general-purpose IC chip 25 generates power by radio waves from the reader/writer 46 and is powered thereby.

The electronic money card 4 stores the server-side electronic money number, the terminal-side electronic money number, and the terminal-side value balance. Moreover, as described in FIGS. 9(a) and (b), the server-side electronic money number and the terminal-side electronic money number may be integrated into a single electronic money number.

When the payment terminal 6 in a real store is used, the electronic money server 2 performs communication with the electronic money card 4 via the payment terminal 6.

When the virtual store server 51 is used, a user terminal 53 that is provided with a reader/writer and can connect to the Internet 3 is used to make the electronic money card 4 perform communication with the virtual store server 51 and the electronic money server 2.

The electronic money card 4 performs short-distance radio communication with the user terminal 53 via the reader/writer, and the virtual store server 51 and the electronic money server 2 can perform communication with the electronic money card 4 via the user terminal 53.

Incidentally, if the user terminal 53 itself has the reader/writer function, it is possible to perform short-distance radio communication directly with the electronic money card 4 without the reader/writer.

As described above, in the electronic money system 1, by making the server-side value balance and the terminal-side value balance work together in real time, it is possible to offer the user the convenience of making up for a shortage in the server-side value balance with the terminal-side value balance.

Incidentally, in the electronic money system 1, the reason why higher priority is given to payment made by using the server-side value balance than payment made by using the terminal-side value balance is that the terminal-side value balance is conserved as much as possible because the asynchronous payment terminal 7 can make payment only by using the terminal-side value balance.

(3) Details of the Second Embodiment

In the second embodiment, if there is a shortfall in payment processing performed by using the server-side value balance, the terminal-side value balance is transferred to the server-side value balance to increase the server-side value balance and payment of the whole payment amount is made by using the server-side value balance.

The configuration of the electronic money system 1 is the same as that of the first embodiment.

Figure 11:
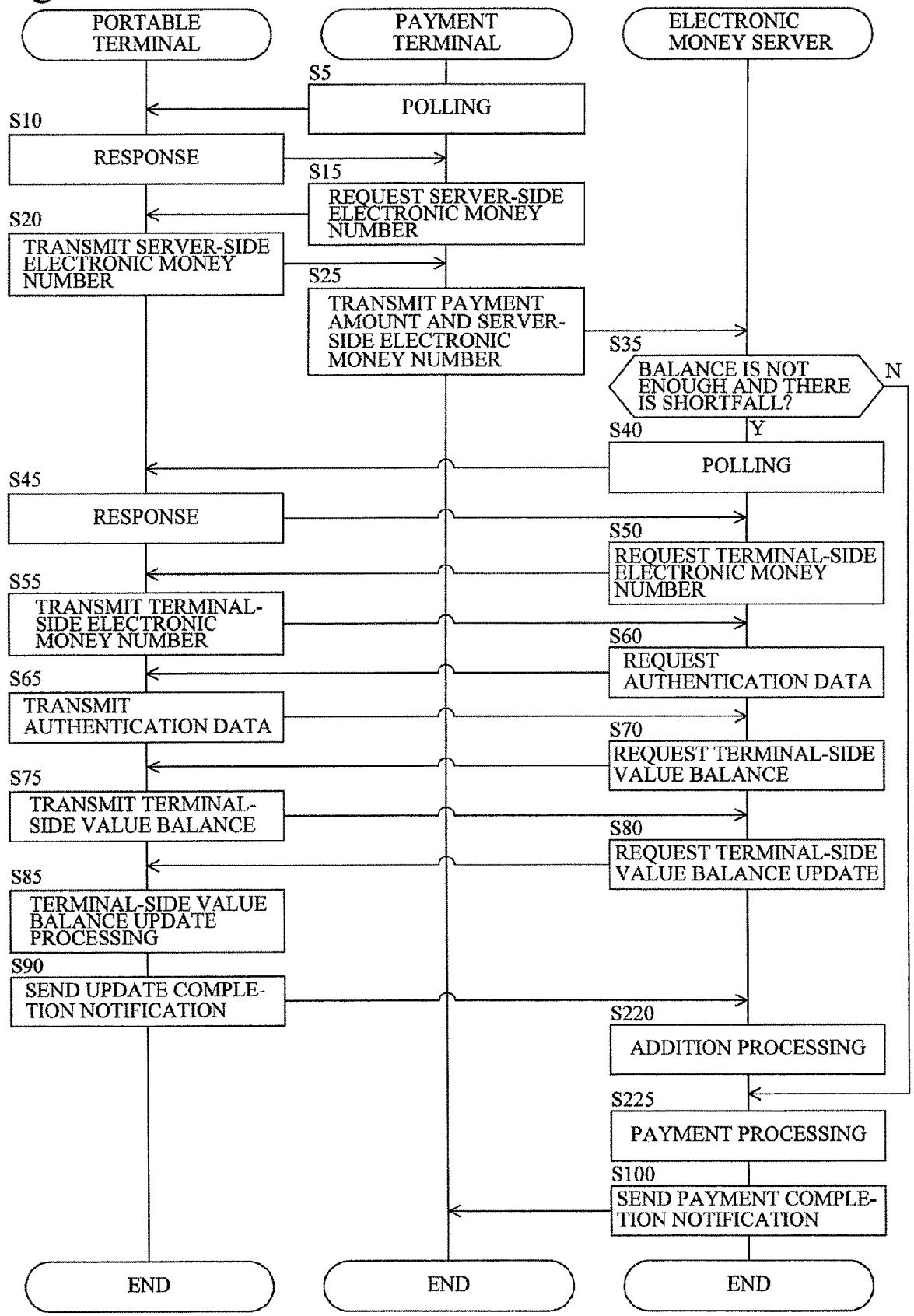
FIG. 11 is a flowchart for explaining a second embodiment.
Figure 12:
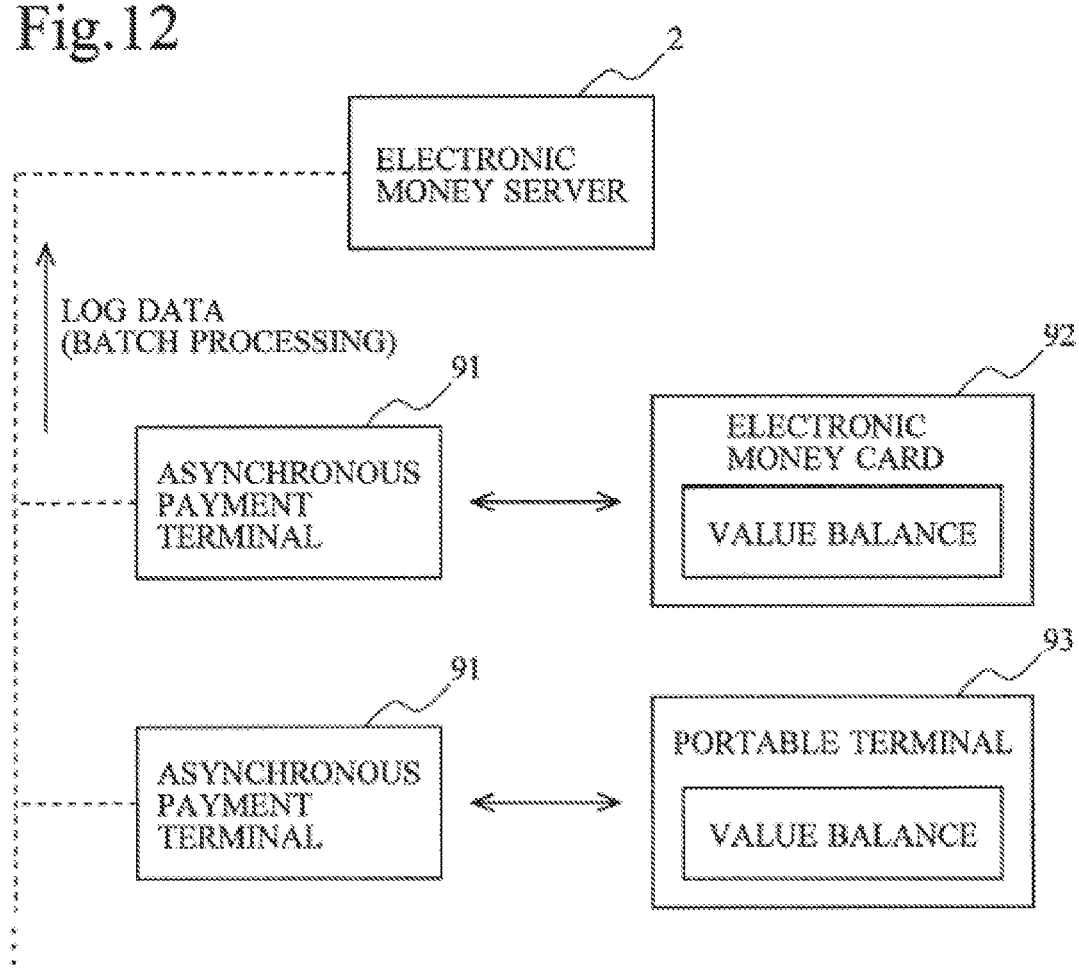
FIG. 12 is a diagram for explaining an existing electronic money system.

FIG. 11 is a flowchart for explaining the procedure by which the electronic money server 2 makes synchronous payment (online payment) in a real store by using the server-side value balance and the terminal-side value balance in the second embodiment.

The same step as the step in FIG. 7 is identified with the same step number and the description will be simplified or omitted.

Step 5 to step 25 are the same as those of FIG. 7.

If there is no shortfall in the server-side value balance (step 35; N), the electronic money server 2 performs payment processing by using the server-side value balance (step 225), sends a payment completion notification to the payment terminal 6 (step 100), and ends the processing.

If there is a shortfall in the server-side value balance (step 35; Y), the procedure proceeds to step 40. Step 40 to step 90 are the same as those of FIG. 7.

When receiving the update completion notification from the portable terminal 5, the electronic money server 2 performs processing to add an amount corresponding to the shortfall to the server-side value balance by adding an amount subtracted from the terminal-side value balance, that is, the amount corresponding to the shortfall to the server-side value balance (step 220).

Then, the electronic money server 2 performs payment processing of the whole payment amount by using the server-side value balance (step 225), sends a payment completion notification to the payment terminal 6 (step 100), and ends the processing.

Incidentally, processing to increase the value balance such as the server-side value balance and the terminal-side value balance is called recharging.

In this embodiment, first, an amount corresponding to the shortfall is subtracted from the terminal-side value balance, and, after an amount corresponding to the amount subtracted from the terminal-side value balance is added to the server-side value balance as recharging, that is, after the amount corresponding to the shortfall is transferred from the terminal-side value balance to the server-side value balance, payment is made.

This is an example, and, for example, a shortage may be first caused in the server-side value balance by making payment by using the server-side value balance and then an amount corresponding to the shortage may be transferred from the terminal-side value balance to the server-side value balance.

Moreover, as another example, when it is confirmed that the terminal-side value balance transmitted in step 75 is larger than or equal to an amount corresponding to the shortfall, the payment amount may be subtracted from the server-side value balance and, at the same time, processing to increase the server-side value balance by the amount corresponding to the shortfall may be performed.

By doing so, even when a shortage is temporarily caused in the server-side value balance, there is no need to perform dealing such as credit (loan) to eliminate the shortage immediately after the shortage is caused.

The first embodiment and the second embodiment have been described above, and these embodiments can be modified in various ways.

Modified Example 1

In the above embodiments, if payment of a payment amount is made preferentially from the server-side value balance and there is a shortfall, payment of an amount corresponding to the shortfall is made by using the terminal-side value balance.

On the other hand, in this modified example, payment is made preferentially from the terminal-side value balance, and payment of an amount corresponding to the shortfall is made by using the server-side value balance.

This example can be used by, for example, parents to manage their child's allowance. That is, the parents give the portable terminal 5 to their child and stores an allowance in the portable terminal 5 as the terminal-side value balance.

Then, in normal times, payment is made preferentially from the terminal-side value balance, and, if there is a shortfall, payment of an amount corresponding to the shortfall is made by using the server-side value balance of the parents.

According to this example, the child can deal with an emergency such as a case where the child cannot use public transportation because the child has spent all his/her allowance, and the parents are allowed to monitor the balance of the child's allowance, the uses thereof, and so forth by checking the history with the electronic money server 2.

Moreover, it is also possible to give different portable terminals 5 to a plurality of children and relate a plurality of terminal-side value balances thereof to a single server-side value balance of the parents. In this case, the server-side electronic money number of the parents is registered in each portable terminal 5.

As described above, when the terminal-side electronic money number of another person is brought into correspondence with the server-side electronic money number of one user, a configuration can be adopted in which they are brought into correspondence with each other in the user DB and the electronic money server 2 makes the server-side value balance of the one user and the terminal-side value balance of the other person work together by referring to this correspondence.

Modified Example 2

In the above embodiments, a case where a threshold value is set for the server-side value balance (the electronic money number having higher payment priority) as a minimum balance and an amount corresponding to a shortfall is subtracted from the terminal-side value balance with the minimum balance being maintained has been described. That is, it is assumed that the balance is not enough when the balance obtained as a result of the threshold value having been subtracted from the server-side value balance becomes less than the payment amount.

In this modified example, this threshold value varies depending on the previously set condition. This condition is stored in the user DB in a state in which the condition is related to the server-side electronic money number, and the electronic money server 2 makes a determination by comparing the server-side value balance with the condition at the time of payment.

For example, when processing to make automatic payment of public utility bills from the server-side value balance is previously set, a value that is greater than or equal to the previously set payment amount is set as a threshold value.

This setting may be made automatically by the electronic money server 2 or the user may make this setting manually by accessing the electronic money server 2.

Moreover, by setting this threshold value at the same value as the server-side value balance, it is possible to obtain the same effect as that obtained by giving payment priority to the terminal-side value balance.

Furthermore, it is possible to set a threshold value also for the terminal-side value balance (the electronic money number having lower payment priority) as a minimum balance.

Then, the electronic money server 2 gives higher priority to the threshold value of the terminal-side value balance than the threshold value of the server-side value balance.

For example, when the terminal-side value balance falls below the minimum balance if an amount corresponding to the shortfall that occurred in payment by using the server-side value balance is subtracted from the terminal-side value balance, the electronic money server 2 reduces the terminal-side value balance to the minimum balance and an amount corresponding to a shortfall is subtracted from the server-side value balance by nullifying the minimum balance of the server-side value balance.

Moreover, a configuration can also be adopted in which, when making payment by using the server-side value balance (the electronic money number having higher priority), the electronic money server 2 checks the terminal-side value balance (the electronic money number having lower priority), and, if the terminal-side value balance is less than the minimum balance, the electronic money server 2 transfers at least part of the server-side value balance to the terminal-side value balance to make the terminal-side value balance have a balance that is larger than or equal to the minimum balance.

In this case, the electronic money server 2 transmits, to the portable terminal 5, a terminal-side value balance update request by which an amount corresponding to the transferred amount is subtracted from the server-side value balance and this amount is added to the terminal-side value balance.

The above-described embodiments and modified examples make it possible to obtain the following configurations.

(1) Since the electronic money server 2 performs payment processing by making the server-side value balance and the terminal-side value balance work together and using the server-side value balance and the terminal-side value balance together, the electronic money server 2 functions as an information processing server that performs payment processing by using the balance of electronic value stored on the server side and the balance of electronic value that is related to the above balance and is stored on the portable terminal side together.

Moreover, since, if there is a shortfall, the electronic money server 2 reduces the terminal-side value balance by sending a command to the portable terminal 5, the electronic money server 2 includes a shortfall amount reducing unit that updates the balance stored on the terminal side by reducing the balance by sending a predetermined instruction to the portable terminal.

(2) In the first embodiment, since the electronic money server 2 makes payment of an amount obtained by subtracting an amount corresponding to a shortfall from a payment amount by using the server-side value balance and makes payment of the amount corresponding to the shortfall by subtracting the amount corresponding to the shortfall from the terminal-side value balance, the shortfall amount reducing unit subtracts the amount corresponding to the shortfall from the balance.

(3) In the second embodiment, by subtracting an amount corresponding to the shortfall from the terminal-side value balance and increasing the server-side value balance by the amount corresponding to the shortfall, the electronic money server 2 transfers the amount corresponding to the shortfall from the terminal-side value balance to the server-side value balance and makes payment of the whole payment amount by using the server-side value balance.

(4) Moreover, the electronic money server 2 can also be configured to set a threshold value of a minimum balance for the server-side value balance and make payment by using an amount that is smaller than or equal to the threshold value and make payment of an amount corresponding to a shortfall by using the terminal-side value balance.

(5) Since the electronic money server 2 can make this threshold value vary in synchronization with, for example, an automatic deduction amount, in this case, the threshold value amount varies depending on a previously set condition.

(6) Furthermore, when the threshold value amount is set for the balance stored on the server side, an automatic deduction amount that is previously set for the balance may be used as the threshold value amount.

(7) Moreover, when a threshold value of the server-side value balance is set to the current whole amount of the server-side value balance, the electronic money server 2 preferentially makes payment from the terminal-side value balance without making payment by using the server-side value balance.

(8) In addition, a configuration can also be adopted in which a second threshold value is set also for the terminal-side value balance and higher priority is given to the second threshold value than the threshold value of the server-side value balance.

In this case, a configuration can be adopted in which, when the balance becomes less than the second threshold value if an amount corresponding to a shortfall is subtracted from the terminal-side value balance, the electronic money server 2 sets an amount to be subtracted from the terminal-side value balance to an amount by which the balance of the terminal-side value balance does not become less than the second threshold value and subtracts an amount corresponding to a shortfall caused thereby from the server-side value balance.

(9) Moreover, when the electronic money server 2 checks the terminal-side value balance by some cue and finds that the balance is less than the second threshold value, the electronic money server 2 can perform control in such a way that the terminal-side value balance becomes larger than or equal to the second threshold value by transferring at least part of the server-side value balance to the terminal-side value balance.

EXPLANATIONS OF LETTERS OR NUMERALS 1 electronic money system
2 electronic money server
3 the Internet
4 electronic money card
5 portable terminal
6 payment terminal
7 asynchronous payment terminal
8 communication line
11 CPU
12 ROM
13 RAM
14 input section
15 output section
16 communication controlling section
17 short-distance communication controlling section
18 storing section
19 bus line
21 subscriber information IC chip
22 information processing section
23 storing section
25 general-purpose IC chip
26 information processing section
27 storing section
31 CPU
32 ROM
33 RAM
34 communication controlling section
35 storing section
36 bus line
41 CPU
42 ROM
43 RAM
44 input section
45 output section
46 reader/writer
47 storing section
48 communication controlling section
49 bus line
51 virtual store server
53 user terminal
91 asynchronous payment terminal
92 electronic money card
93 portable terminal

The invention claimed is:

1. An information processing system, comprising:
   a server;
   an asynchronous payment terminal; and
   a synchronous payment terminal,
   wherein the server connects to a terminal device storing a first electronic value in an integrated circuit (IC) chip of the terminal device and having a function of increasing or decreasing a balance of the first electronic value in response to a balance update request,
   wherein the asynchronous payment terminal is configured to settle payment from the terminal device by using only the first electronic value, and the synchronous payment terminal is configured to settle the payment from the terminal device by using any one of the first electronic value, a second electronic value stored in the server, or a combination thereof,
   the server comprising:
   at least one memory operable to store program code; and
   at least one processor operable to read the program code and operate as instructed by the program code to perform:
      storing, in a storage on the server, a balance of the second electronic value that is related to identification information of a user of the terminal device;
      receiving log data stored in the asynchronous payment terminal and storing the received log data in a log data database, the log data indicating a history of a transaction performed locally between the asynchronous payment terminal and the IC chip of the terminal device by using the balance of the first electronic value stored in the IC chip of the terminal device, and a fund transfer managed by the server based on the log data being asynchronous with the server;
      in response to receiving a request for a payment of a designated payment amount from the synchronous payment terminal:
         in response to determining that a shortfall occurs when the payment of the designated payment amount is to be made by using a payable amount of the second electronic value, determining whether the balance of the first electronic value stored in the IC chip of the terminal device is equal to or greater than an amount corresponding to the shortfall;
         in response to determining that the balance of the first electronic value stored in the IC chip of the terminal device is equal to or greater than the amount corresponding to the shortfall, transmitting the balance update request to the terminal device to reduce the balance of the first electronic value stored in the IC chip of the terminal device by at least the amount corresponding to the shortfall; and
         completing the payment of the designated payment amount by using the payable amount of the second electronic value and an amount corresponding to the reduced balance of the first electronic value,
   wherein the program code further causes the at least one processor to perform payment processing by updating at least one of the first electronic value or the second electronic value in real time while performing communication with the terminal device,
   wherein a first threshold value amount is set as a minimum balance of the first electronic value to be maintained, and a second threshold value amount is set as a minimum balance of the second electronic value to be maintained, and the payable amount of the second electronic value is an amount obtained by subtracting the second threshold value amount set for the second electronic value from the balance of the second electronic value, and
   wherein the at least one processor of the server gives a higher priority to the first threshold value amount of the first electronic value such that when the balance of the first electronic value falls below the first threshold value amount if the balance of the first electronic value is reduced by the at least the amount corresponding to the shortfall, the at least one processor reduces the balance of the first electronic value to the minimum balance of the first threshold value amount and the amount corresponding to the shortfall is subtracted from the second electronic value by nullifying the minimum balance of the second electronic value.

2. The information processing system according to claim 1, wherein
   in response to the balance update request, the balance of the first electronic value is reduced by an amount, which is smaller than the designated payment amount by the at least the amount corresponding to the shortfall.

3. The information processing system according to claim 1, wherein
   in response to the balance update request, the at least the amount corresponding to the shortfall is transferred from the balance of the first electronic value to the balance of the second electronic value.

4. The information processing system according to claim 1, wherein the payment of the designated payment amount is completed by:
   subtracting the designated payment amount from the payable amount of the second electronic value in response to determining that the balance of the first electronic value is larger than or equal to the amount corresponding to the shortfall, and
   increasing the payable amount of the second electronic value by the at least the amount corresponding to the shortfall.

5. The information processing system according to claim 1, wherein
   the threshold value amount varies depending on a previously set condition.

6. The information processing system according to claim 5, wherein the at least one processor further operates as instructed by the program code to perform:
   updating the threshold value amount such that the threshold value amount becomes an amount that is larger than or equal to a subsequent automatic deduction amount that is previously set for the balance of the second electronic value in response to the subsequent automatic deduction amount being varied.

7. The information processing system according to claim 5, wherein the at least one processor further operates as instructed by the program code to perform:
   updating the threshold value amount such that the threshold value amount becomes a same amount as the balance of the second electronic value every time the balance of the second electronic value is updated.

8. The information processing system according to claim 1, wherein when a balance obtained by subtracting the amount corresponding to the shortfall from the balance of the first electronic value becomes less than the second threshold value amount,
the balance update request is transmitted to the terminal device to reduce the balance of the first electronic value in such a way that the balance of the first electronic value after subtraction does not fall below the second threshold value amount, and
the payment of the designated payment amount is completed by subtracting a difference between the amount subtracted from the first electronic value and the amount corresponding to the shortfall from the payable amount of the second electronic value.

9. The information processing system according to claim 1, wherein
when the balance of the first electronic value is less than the second threshold value amount,
the payment of the designated payment amount is completed by subtracting at least the amount corresponding to the shortfall from the balance of the second electronic value and adding the amount subtracted from the balance of the second electronic value to the balance of the first electronic value.

10. The information processing system according to claim 1, wherein
the at least one processor make settings such that the second electronic value stored in the storage of the server has higher payment priority than the first electronic value stored in the IC chip of the terminal device.

11. An information processing method, performed by an information processing server, which establishes connection to a terminal device, the terminal device storing a first electronic value in an integrated circuit (IC) chip of the terminal device and having a function of increasing or decreasing a balance of the first electronic value in response to a balance update request, the method comprising:
storing, in a storage on the information processing server, a balance of a second electronic value that is related to identification information of a user of the terminal device;
receiving log data stored in an asynchronous payment terminal and storing the received log data in a log data database, the log data indicating a history of a transaction performed locally between the asynchronous payment terminal and the IC chip of the terminal device by using the balance of the first electronic value stored in the IC chip of the terminal device, and a fund transfer managed by the information processing server based on the log data being asynchronous with the information processing server;
in response to receiving a request for a payment of a designated payment amount from a synchronous payment terminal:
in response to determining that a shortfall occurs when the payment of the designated payment amount is to be made by using a payable amount of the second electronic value stored in the information processing server, determining whether the balance of the first electronic value stored in the IC chip of the terminal device is equal to or greater than an amount corresponding to the shortfall;
in response to determining that the balance of the first electronic value stored in the IC chip of the terminal device is equal to or greater than the amount corresponding to the shortfall, transmitting the balance update request to the terminal device to reduce the balance of the first electronic value stored in the IC chip of the terminal device by at least the amount corresponding to the shortfall; and
completing the payment of the designated payment amount by using the payable amount of the second electronic value and an amount corresponding to the reduced balance of the first electronic value,
wherein the completing the payment comprises updating at least one of the first electronic value or the second electronic value in real time while performing communication with the terminal device,
wherein a first threshold value amount is set as a minimum balance of the first electronic value to be maintained, and a second threshold value amount is set as a minimum balance of the second electronic value to be maintained, and the payable amount of the second electronic value is an amount obtained by subtracting the second threshold value amount set for the second electronic value from the balance of the second electronic value, and
wherein the information processing server gives a higher priority to the first threshold value amount of the first electronic value such that when the balance of the first electronic value falls below the first threshold value amount if the balance of the first electronic value is reduced by the at least the amount corresponding to the shortfall, the information processing server reduces the balance of the first electronic value to the minimum balance of the first threshold value amount and the amount corresponding to the shortfall is subtracted from the second electronic value by nullifying the minimum balance of the second electronic value.

12. A non-transitory recording medium on which an information processing program product is recorded, the information processing program product causing at least one processor of an information processing server, that connects to a terminal device storing a first electronic value in an integrated circuit (IC) chip of the terminal device and having a function of increasing or decreasing a balance of the first electronic value in response to a balance update request, to perform:
storing, in a storage on the information processing server, a balance of a second electronic value that is related to identification information of a user of the terminal device;
receiving log data stored in an asynchronous payment terminal and storing the received log data in a log data database, the log data indicating a history of a transaction performed locally between the asynchronous payment terminal and the IC chip of the terminal device by using the balance of the first electronic value stored in the IC chip of the terminal device, and fund transfer managed by the information processing server based on the log data being asynchronous with the information processing server;
in response to receiving a request for a payment of a designated payment amount from a synchronous payment terminal:
in response to determining that a shortfall occurs when the payment of the designated payment amount is to be made by using a payable amount of the second electronic value stored in the information processing server, determining whether the balance of the first electronic value stored in the IC chip of the terminal device is equal to or greater than an amount corresponding to the shortfall;

in response to determining that the balance of the first electronic value stored in the IC chip of the terminal device is equal to or greater than the amount corresponding to the shortfall, transmitting the balance update request to the terminal device to reduce the balance of the first electronic value stored in the IC chip of the terminal device by at least the amount corresponding to the shortfall; and completing the payment of the designated payment amount by using the payable amount of the second electronic value and an amount corresponding to the reduced balance of the first electronic value, wherein the completing the payment comprises updating at least one of the first electronic value or the second electronic value in real time while performing communication with the terminal device, wherein a first threshold value amount is set as a minimum balance of the first electronic value to be maintained, and a second threshold value amount is set as a minimum balance of the second electronic value to be maintained, and the payable amount of the second electronic value is an amount obtained by subtracting the second threshold value amount set for the second electronic value from the balance of the second electronic value, and wherein the at least one processor of the information processing server gives a higher priority to the first threshold value amount of the first electronic value such that when the balance of the first electronic value falls below the first threshold value amount if the balance of the first electronic value is reduced by the at least the amount corresponding to the shortfall, the at least one processor reduces the balance of the first electronic value to the minimum balance of the first threshold value amount and the amount corresponding to the shortfall is subtracted from the second electronic value by nullifying the minimum balance of the second electronic value.

* * * * *